United States Patent
Suzuki et al.

(10) Patent No.: US 7,813,748 B2
(45) Date of Patent: Oct. 12, 2010

(54) GROUP COMMUNICATIONS SWITCHING METHOD, SUBSCRIBER TERMINAL AND SERVER USED FOR THE METHOD

(75) Inventors: Takahito Suzuki, Kawasaki (JP); Saiki Kawamura, Kawasaki (JP); Naoyuki Kakizaki, Kawasaki (JP); Yayoi Itoh, Kawasaki (JP); Kiyomi Hasesaka, Kawasaki (JP); Hiroyasu Taguchi, Kawasaki (JP); Hiroki Yokoyama, Kawasaki (JP); Yoshikazu Takeda, Kawasaki (JP); Kiyoshi Hirouchi, Kawasaki (JP); Satoru Abe, Kawasaki (JP); Takahiro Kikuchi, Kawasaki (JP); Nobuaki Kitazumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 11/600,080

(22) Filed: Nov. 16, 2006

(65) Prior Publication Data
US 2008/0004060 A1    Jan. 3, 2008

(30) Foreign Application Priority Data
Jun. 28, 2006    (JP)    ............... 2006-178479

(51) Int. Cl.
*H04Q 7/20* (2006.01)
(52) U.S. Cl. ............... 455/518; 455/519; 455/517; 455/500; 455/445; 455/414.1; 370/310; 370/352; 370/312

(58) Field of Classification Search ............ 455/518, 455/519, 517, 500, 550.1, 466, 416, 422.1, 455/412.1, 412.2, 445, 414.1–414.4, 403, 455/450–452.1, 509; 370/352, 312, 310
See application file for complete search history.

(56) References Cited

U.S. PATENT DOCUMENTS

| | | | |
|---|---|---|---|
| 2004/0127233 A1* | 7/2004 | Harris et al. | ............ 455/458 |
| 2005/0239485 A1* | 10/2005 | Kundu et al. | ............ 455/519 |
| 2007/0110029 A1* | 5/2007 | Gilmore et al. | ............ 370/352 |

FOREIGN PATENT DOCUMENTS

| | | |
|---|---|---|
| JP | 04-070226 | 3/1992 |
| JP | 2002-016973 | 1/2002 |

* cited by examiner

*Primary Examiner*—Keith T Ferguson
(74) *Attorney, Agent, or Firm*—Hanify & King, P.C.

(57) ABSTRACT

A group communications switching method is disclosed. The method includes the steps of: maintaining a voice call between a first subscriber terminal and a second subscriber terminal when it becomes necessary to perform group communications while the voice call is in progress; starting a group communications call by the first subscriber terminal so as to call at least a group communications member other than the first subscriber terminal and the second subscriber terminal; and disconnecting the voice call between the first subscriber terminal and the second subscriber terminal when the group communications call is established.

7 Claims, 23 Drawing Sheets

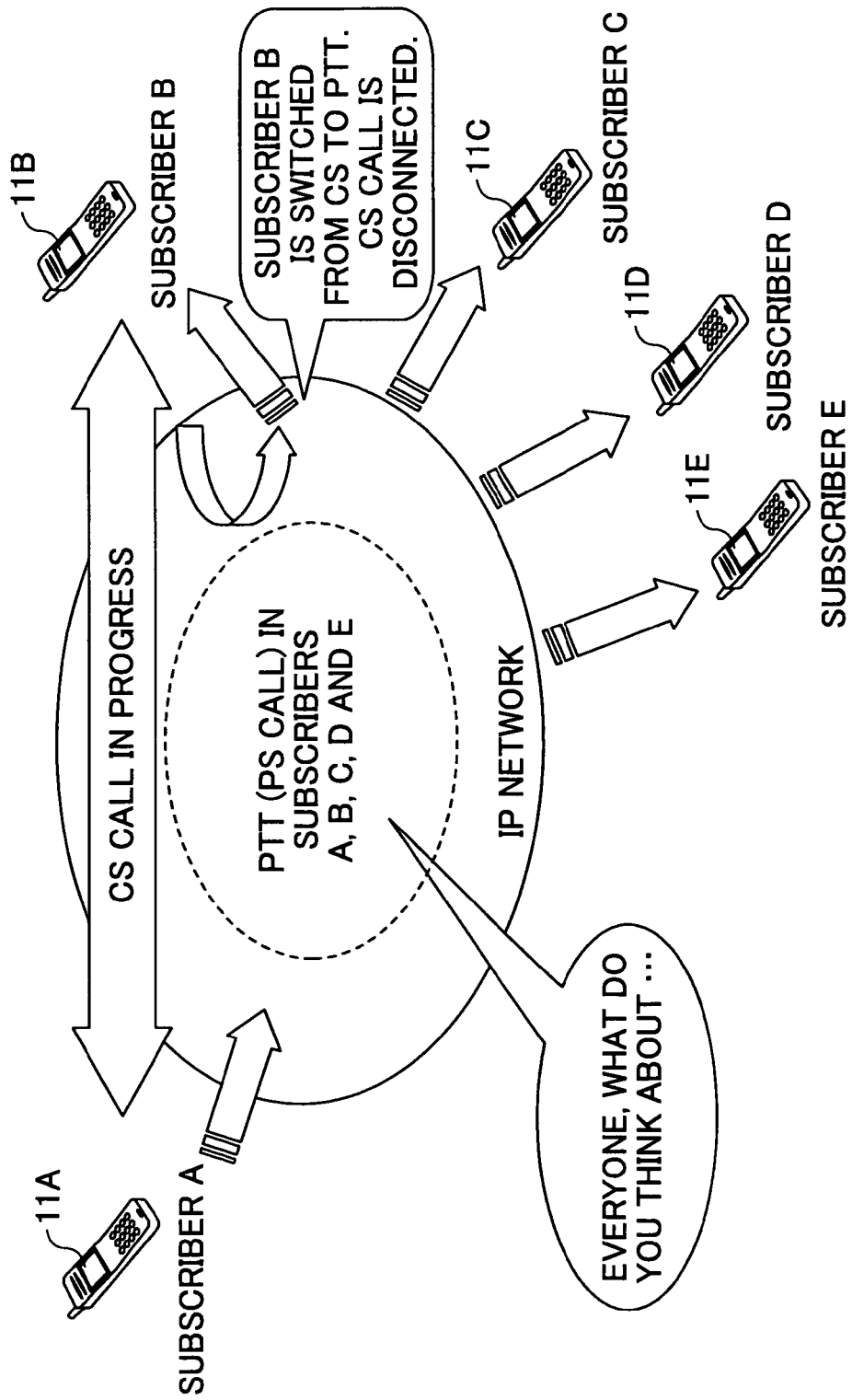

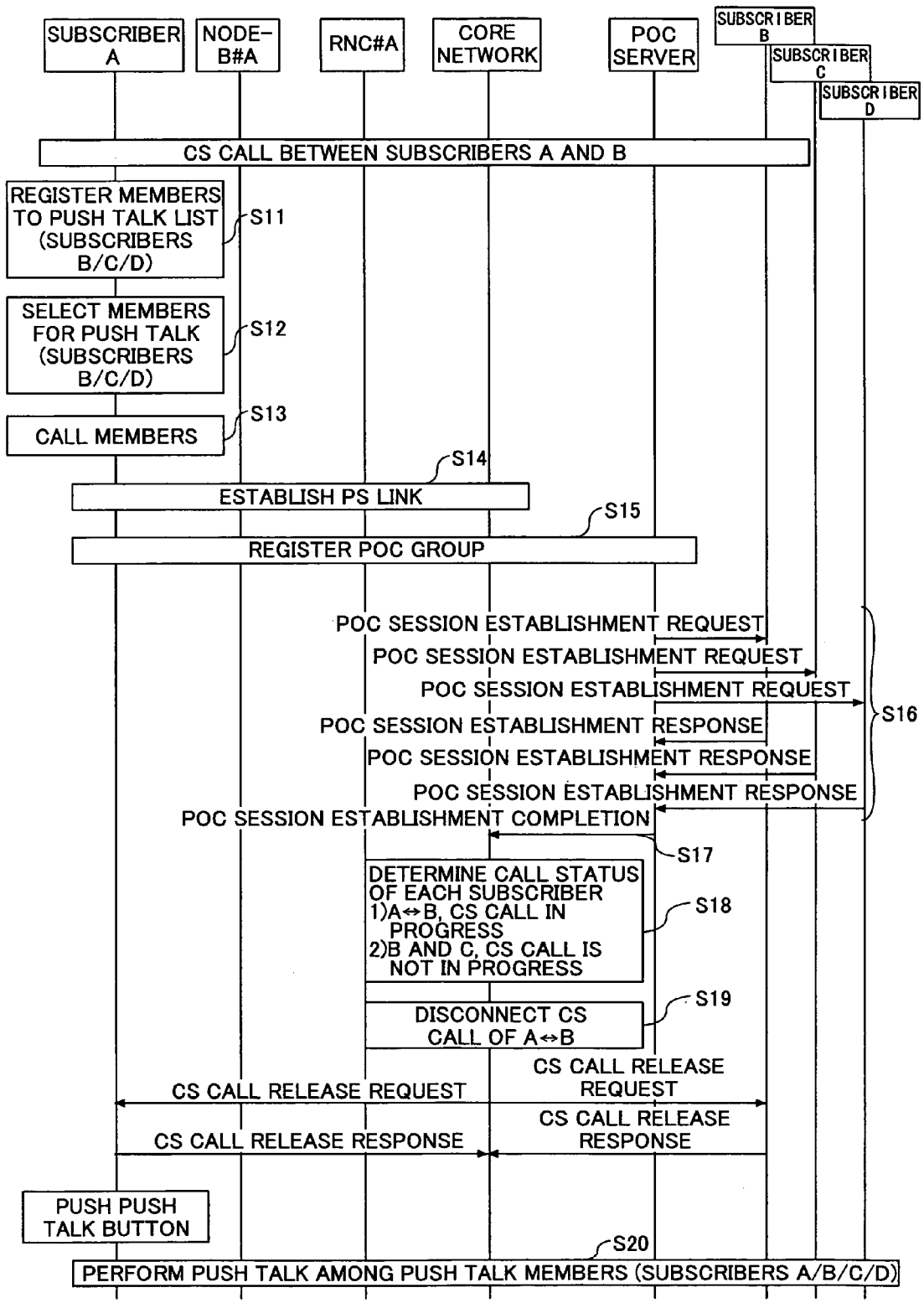

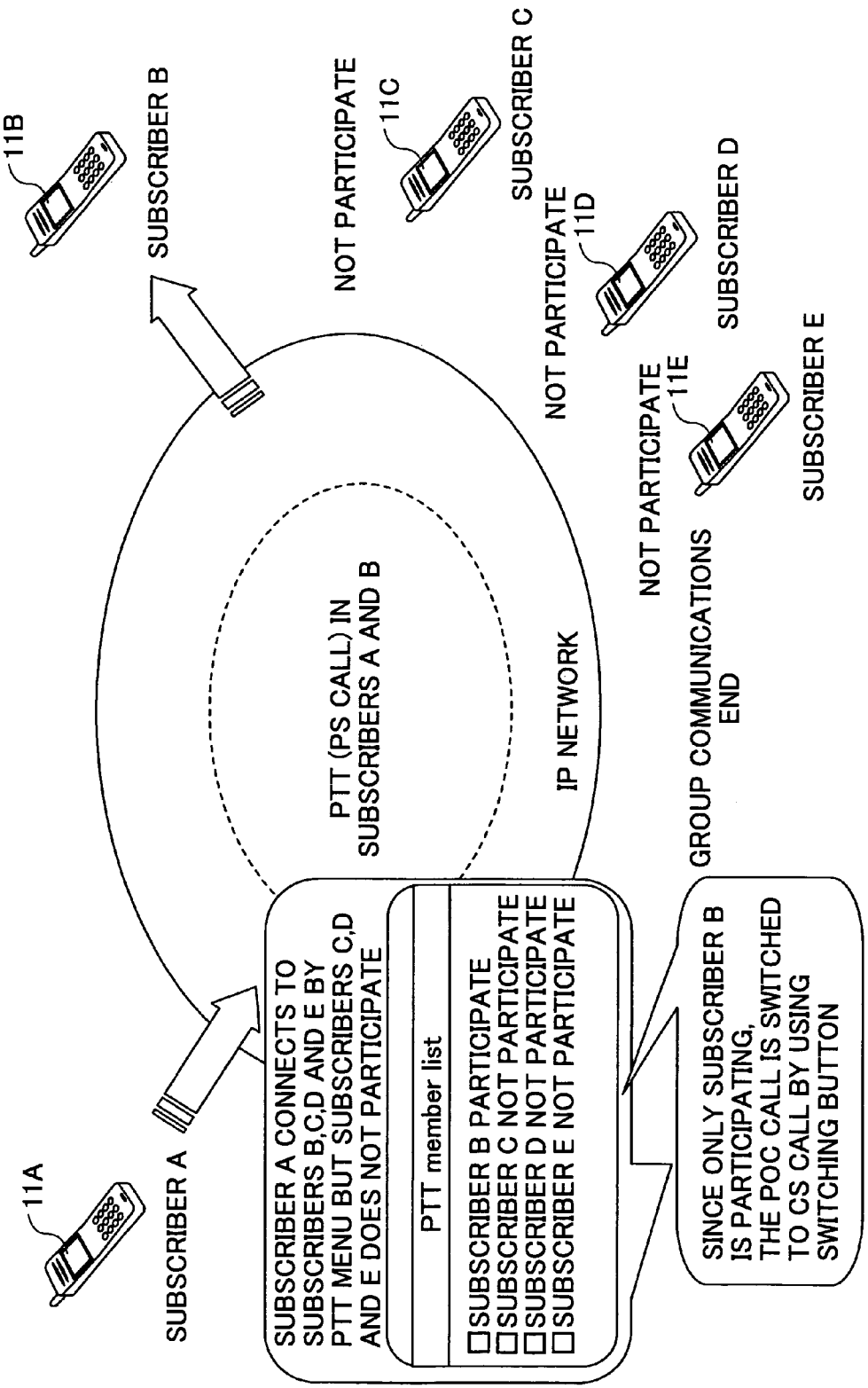

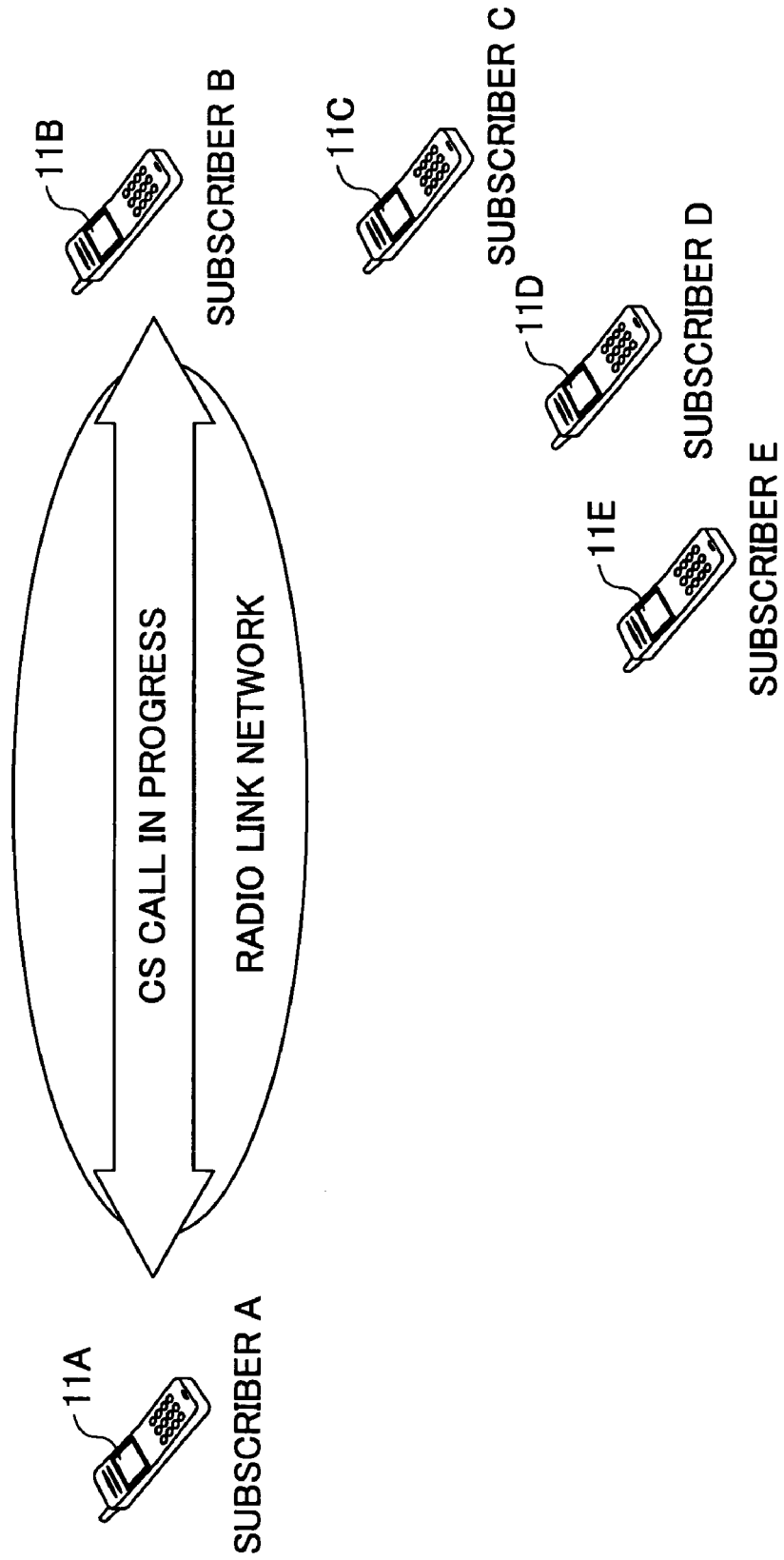

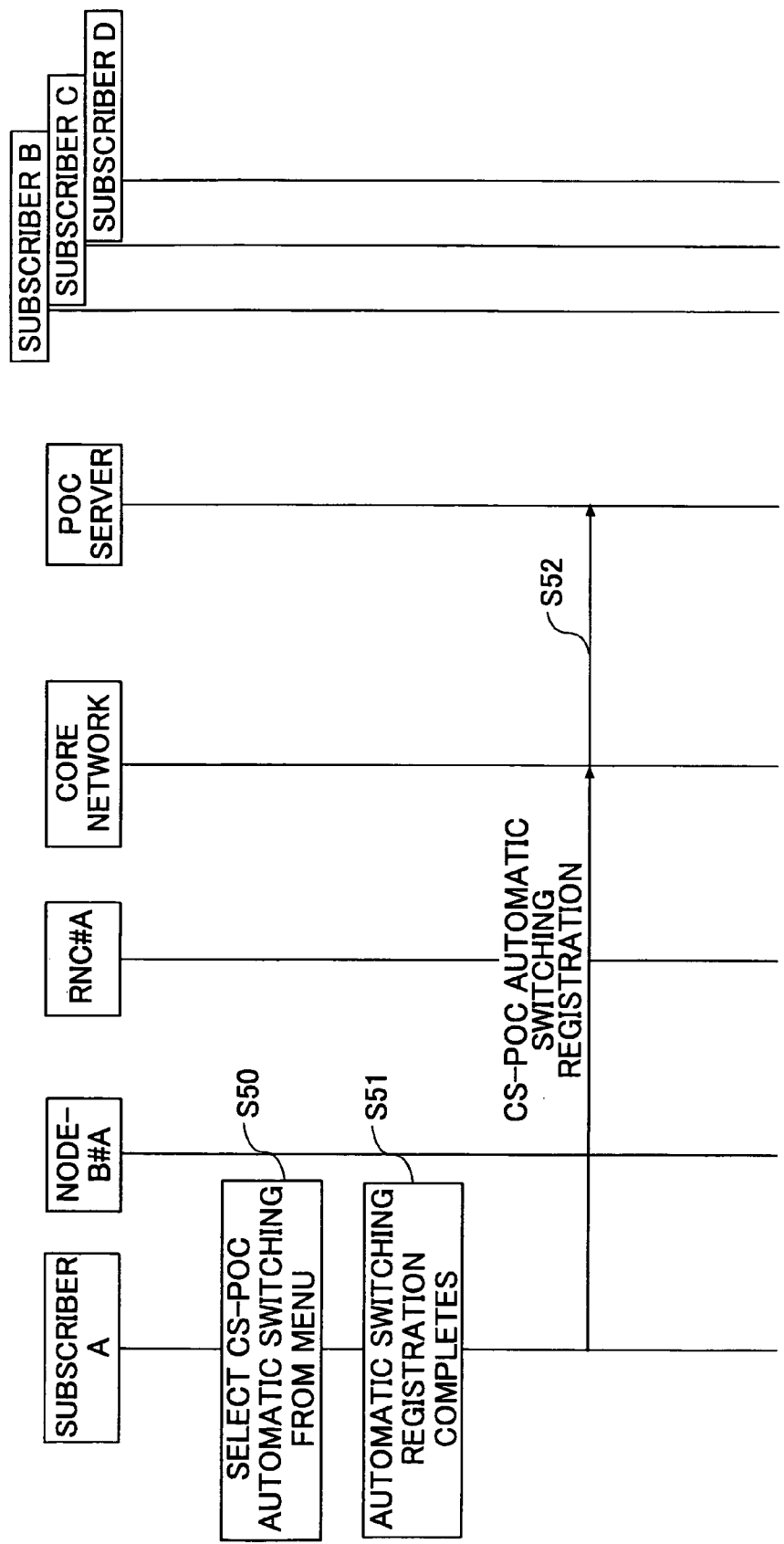

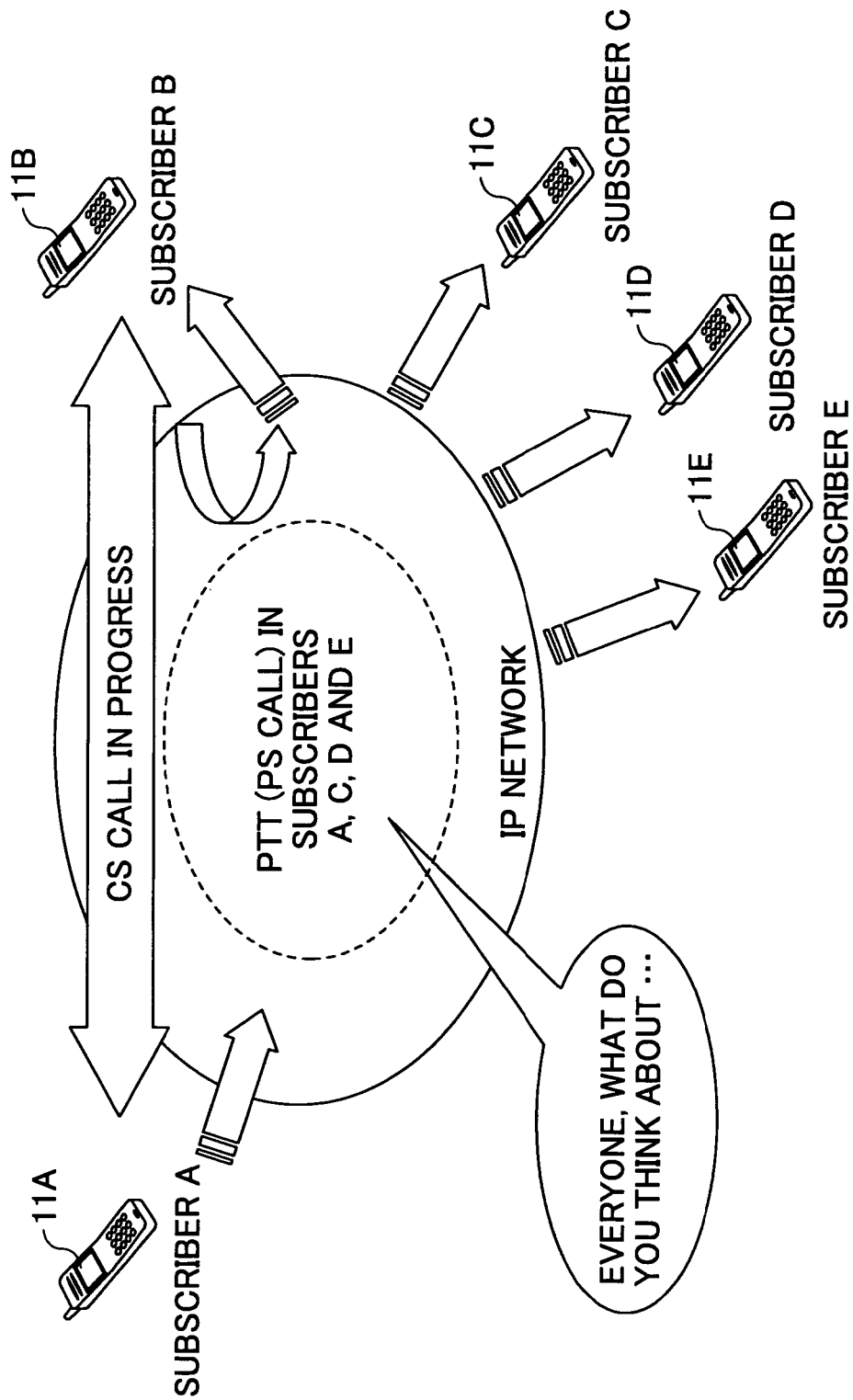

GROUP COMMUNICATIONS SWITCHING METHOD, SUBSCRIBER TERMINAL AND SERVER USED FOR THE METHOD

BACKGROUND OF THE INVENTION

1. Field of the Invention

The present invention relates to a group communications switching method, and a subscriber terminal and a server used for the method. More particularly, the present invention relates to a group communications switching method, and a subscriber terminal and a server used for the method for switching between group communications and voice communications.

2. Description of the Related Art

OMA (Open Mobile Alliance) that is an industry organization of mobile communications standardizes group communications as "Push-to-Talk over Cellular (to be referred to as "POC" hereinafter) Phase One". The POC is a kind of VoIP (Voice over Internet Protocol) for communicating voice over a data communications network using IP (Internet Protocol), and is developed for mobile communications. The POC uses the data communications network, and does not use a circuit switching scheme. The POC is a technology for realizing communications like those performed by a transceiver in which "push a button" and "talk".

In the POC, without dialing the other party's telephone number that is necessary in the circuit switching scheme, the user of the POC selects the other parties and pushes a button so as to be able to connect to the parties within a few seconds. In addition to one-to-one communications, simultaneous connections among plural terminals that form a group is available in the POC.

In the POC, voice of a user who is pushing the button is sent to the grouped parties. A user who pushes the button first gets a right to talk where other users can only hear the voice. In addition, different from the circuit switching scheme, since the POC uses the data communications network, users can use the communications service at lower cost than that for conventional voice communications.

As a prior art, Japanese Laid-Open Patent Application No. 4-70226 discloses a cordless phone system in which a handset is connected to another handset via a dedicated channel. In the cordless phone system, when a switch is turned on while communications are being performed between two parties, group communications become available.

As another prior art, Japanese Laid-Open Patent Application No. 2002-16973 discloses a mobile communications system for performing conference communications in which group communications can be switched to communications between two parties by pushing a switching button when the two party communications become necessary.

Currently, according to the specification of POC, POC cannot be used concurrently with normal voice call, TV phone or data communications. For example, when POC call arrives while the normal voice communications or TV phone communications are being performed, the user needs to decide whether to continue the normal voice communications/TV phone communications or to end the normal voice communications/TV phone communications in order to start the POC.

When normal voice call or TV phone call arrives while the POC is being used, the user needs to decide whether to continue the POC call or to interrupt the POC to start the normal voice communications or TV phone communications. In either case, there is a problem in that the user needs to decide a service over a short amount of time.

In addition, in an existing service for switching the POC call to a normal circuit switching voice call, a connection of the normal voice call is established while POC is being performed. Then, when all users participating in a group of the POC complete the POC call, switching to the normal voice call completes. In this switching procedure, since it is necessary that other users end the POC, there is a problem in that switching cannot be completed quickly.

SUMMARY OF THE INVENTION

An object of the present invention is to provide a group communications switching method for performing switching between circuit switching voice call and group communications call, and to provide a subscriber terminal and a server using the method.

The object can be achieved by a group communications switching method including the steps of:

maintaining a voice call between a first subscriber terminal and a second subscriber terminal when it becomes necessary to perform group communications while the voice call is in progress;

starting a group communications call by the first subscriber terminal so as to call at least a group communications member other than the first subscriber terminal and the second subscriber terminal; and disconnecting the voice call between the first subscriber terminal and the second subscriber terminal when the group communications call is established.

The object can be also achieved by a subscriber terminal including:

a group communications call starting unit configured to establish a group communications call while a voice call is being maintained; and a unit configured to disconnect the voice call when the group communications call is established.

The object can be also achieved by a server including:

a monitoring unit configured to monitor at least a member participating in group communications;

a switching request unit configured to request a core network to switch the group communications to a voice call when members participating in the group communications become two subscriber terminals, a group communications call disconnecting unit configured to disconnect the group communications call when the voice call between the two subscriber terminals is established.

According to the present invention, switching between the CS call and the group communications call can be performed seamlessly.

BRIEF DESCRIPTION OF THE DRAWINGS

Other objects, features and advantages of the present invention will become more apparent from the following detailed description when read in conjunction with the accompanying drawings, in which:

FIGS. 5A-5C are figures for explaining a first embodiment of the present invention;

FIG. 6 shows a sequence among apparatuses in the first embodiment of the present invention;

FIGS. 8A-8C are figures for explaining a third embodiment of the present invention;

FIGS. 10A-10B are figures for explaining a fourth embodiment of the present invention;

FIG. 13 shows a sequence among apparatuses for automatic switching/manual switching setting;

FIGS. 14A-14C are figures for explaining a fifth embodiment of the present invention;

DETAILED DESCRIPTION OF THE PREFERRED EMBODIMENTS

In the following, embodiments of the present invention are described with reference to figures.

<Configuration of Mobile Communications Network>

Figure 1:
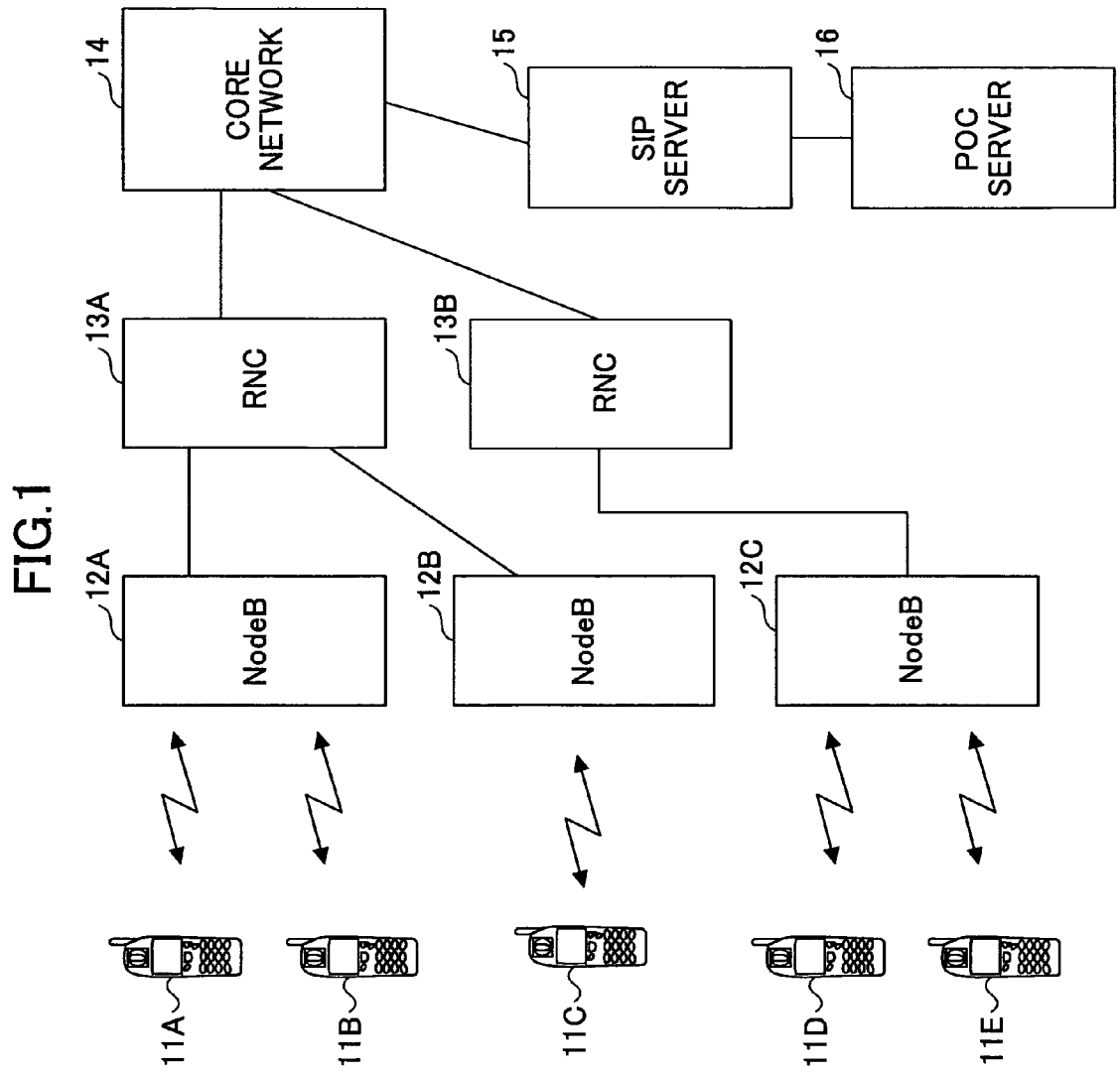
FIG. 1 is a block diagram of a mobile communications network to which an embodiment of the method of the present invention is applied.

FIG. 1 is a block diagram of a mobile communications network to which the method of the present invention is applied. The mobile communications network includes subscriber terminals (UE) 11A-11E, radio base stations (Node B) 12A-12C, radio network control apparatuses (RNC) 13A and 13B and a core network 14 which are configured to be like a pyramid. A SIP (Session Initiation Protocol) server 15 is connected to the core network 14 via a network, and a POC server 16 is connected to the SIP server 15.

Each of the subscriber terminals 11A-11E is a mobile terminal used by a user that can move while communications are performed, and is connected to one of the radio network control apparatuses 13A and 13B via one of the radio base stations 12A and 12B.

The radio base stations 12A-12C control a plurality of cells, and communicate with the subscriber terminals 11A-11E in the plurality of cells. Each of the radio base stations can transfer a call control signal from the subscriber terminal to the radio network control apparatus, and can transfer a radio circuit control signal from the radio network control apparatus to the subscriber terminal.

Each of the radio network control apparatuses 13A and 13B performs radio circuit control between the radio network control apparatus and the radio base station, performs call connection control, handover control, and communication speed control for the subscriber terminals 11A-11E, and the like. When a subscriber terminal originates a call, the radio network control apparatus (13A, 13B) sends a signal sent from the subscriber terminal to the core network 14 via the radio base station so as to perform radio circuit control for the radio base station. When the subscriber terminal receives an incoming call, the radio network control apparatus sends a signal from the core network 14 to radio base stations placed near the subscriber terminal, and the radio network control apparatus receives a response from the subscriber terminal via the radio base station in which the subscriber terminal resides so as to perform connection control.

The core network 14 is a node for connecting between a radio circuit network and a circuit switching network. The core network can be configured as a server or a plurality of servers that are connected via a network. When the core network 14 receives a call connection request indicating a request to connect to the outside of the radio circuit network, the core network 14 performs connection control between switches. When receiving an incoming call request from the outside of the radio circuit network, and when the position of the subscriber terminal of call destination is within the radio switching network, the core network 14 broadcasts an incoming signal to radio network control apparatuses corresponding to the network area.

The POC server 16 is connected to the core network 14 via the SIP server 15, and controls the POC service.

<Configuration of Subscriber Terminal>

Figure 2:
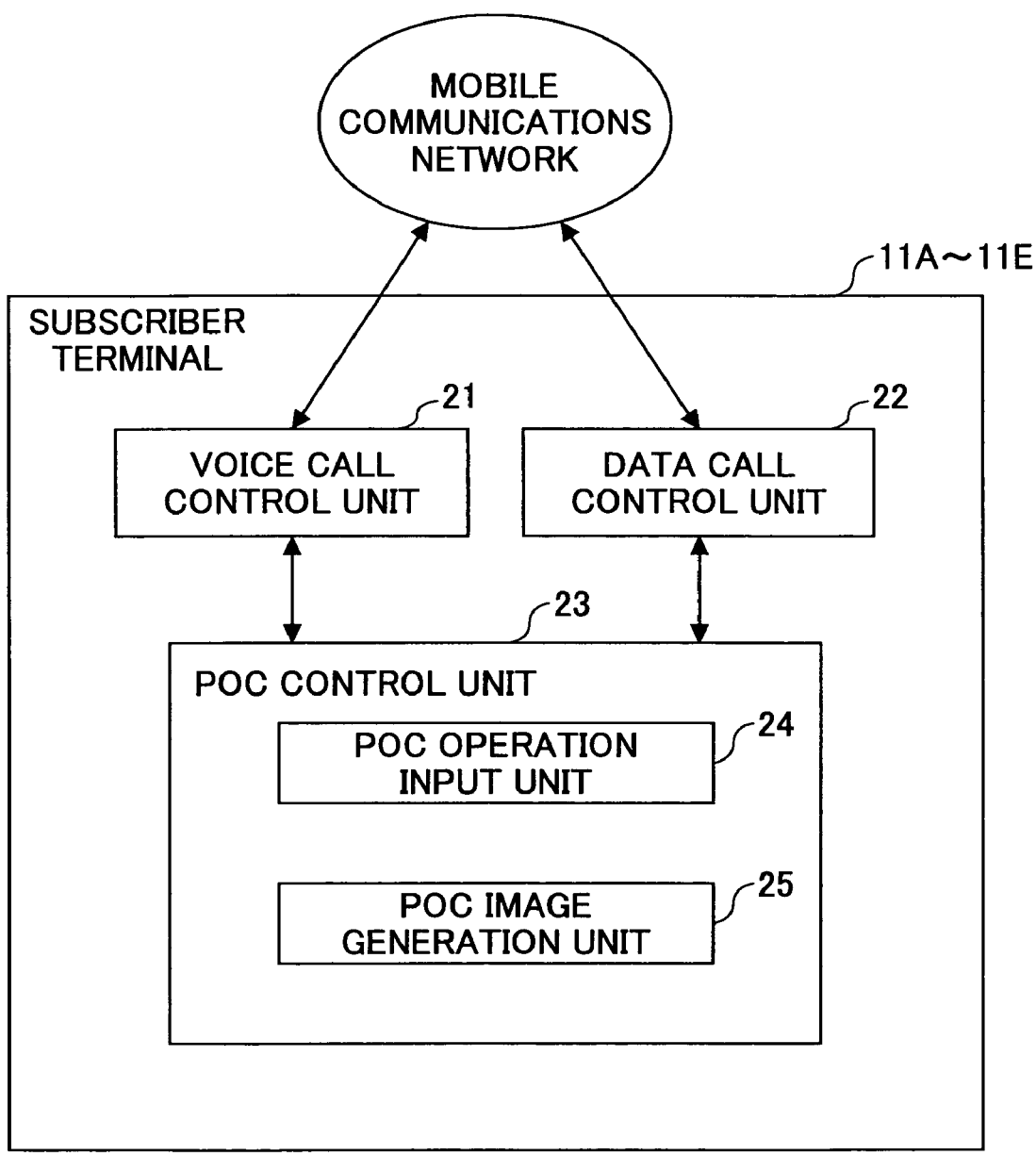
FIG. 2 shows a functional block diagram of a subscriber terminal.

FIG. 2 shows a functional block diagram of the subscriber terminal (11A-11E). As shown in the figure, the subscriber terminal includes a voice call control unit 21, a data call control unit 22, and a POC control unit 23. The POC control unit 23 includes a POC operation input unit 24 and a POC image generation unit 25. In the figure, the voice call control unit 21 performs call control for voice calls (CS (circuit switching) call). The data call control unit 22 performs call control for data communications including POC. The voice call control unit 21 and the data call control unit 22 can establish a call connection of the voice call and a POC session at the same time and can control them.

The POC control unit 23 performs control of POC such as selection or registration of members participating in the group communications, establishment or release of a group communications call (POC session), and performs setting for POC to CS automatic switching, and the like.

The POC operation input unit 24 in the POC control unit 23 is for receiving operation inputs from a push talk button, from a roger button, and from an end-call button and the like. The POC image generation unit 25 generates an image for displaying a POC status such as a push talk list, and an image necessary for POC operation such as POC operation so as to display the image on a screen of the subscriber terminal.

<Configuration of the Core Network>

Figure 3:
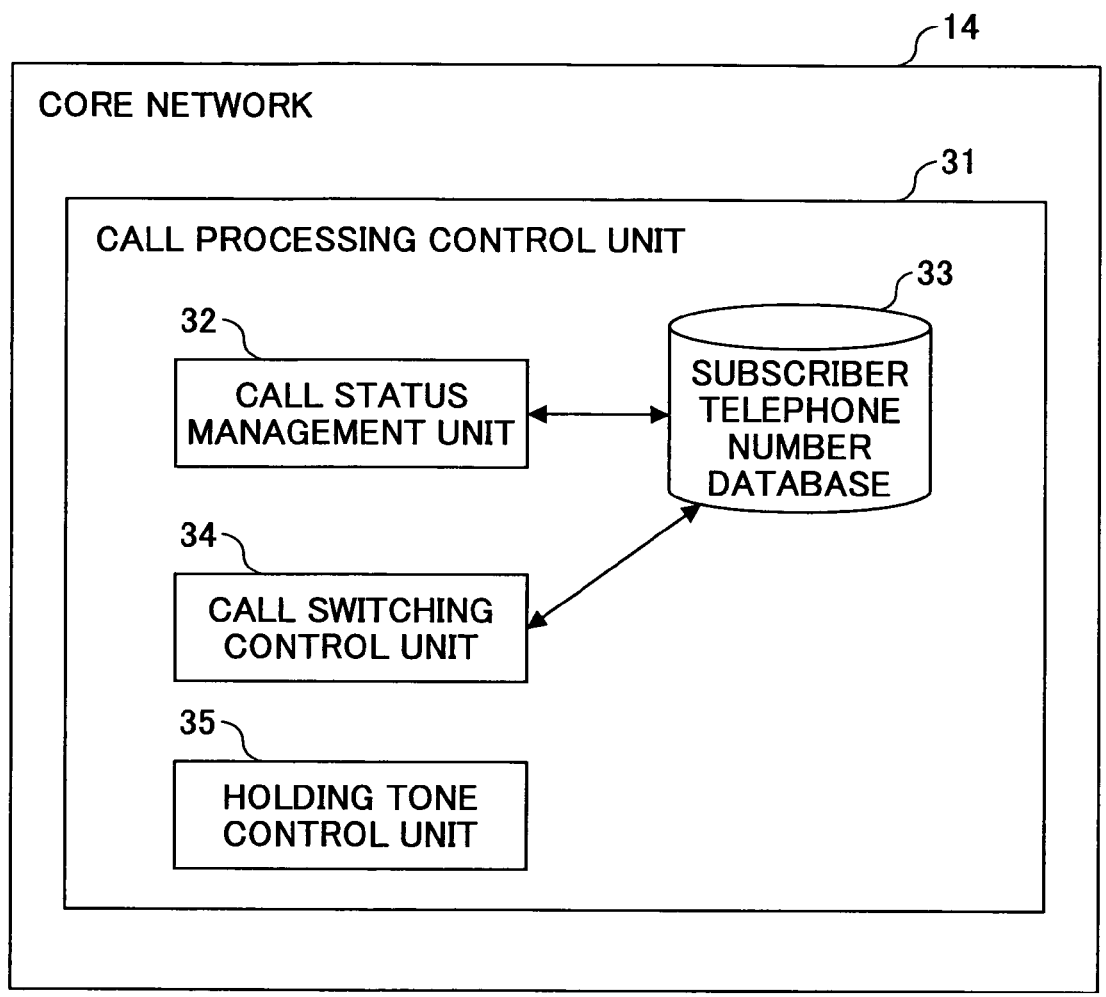
FIG. 3 shows a functional block diagram of a core network.

FIG. 3 shows a functional block diagram of the core network 14. As shown in the figure, the core network 14 includes a call processing control unit 31. The call processing control unit 31 includes a call status management unit 32, a call switching control unit 34, a holding tone control unit 35 and a subscriber telephone number database 33. The call processing unit 31 performs switching processing between voice call (CS call) and data call. The call status management unit 32 stores call statuses of each subscriber into the subscriber telephone number database 33 so as to manage the call status of each subscriber for each subscriber telephone number. The call status stored in the subscriber telephone number database 33 includes information indicating whether a telephone conversation is performed via the circuit switching scheme or the POC session.

The call switching control unit 34 controls switching between voice communications (CS call) and group communications (POC session). The holding tone control unit 35 controls a holding tone sent to a particular subscriber terminal.

<Configuration of POC Server>

Figure 4:
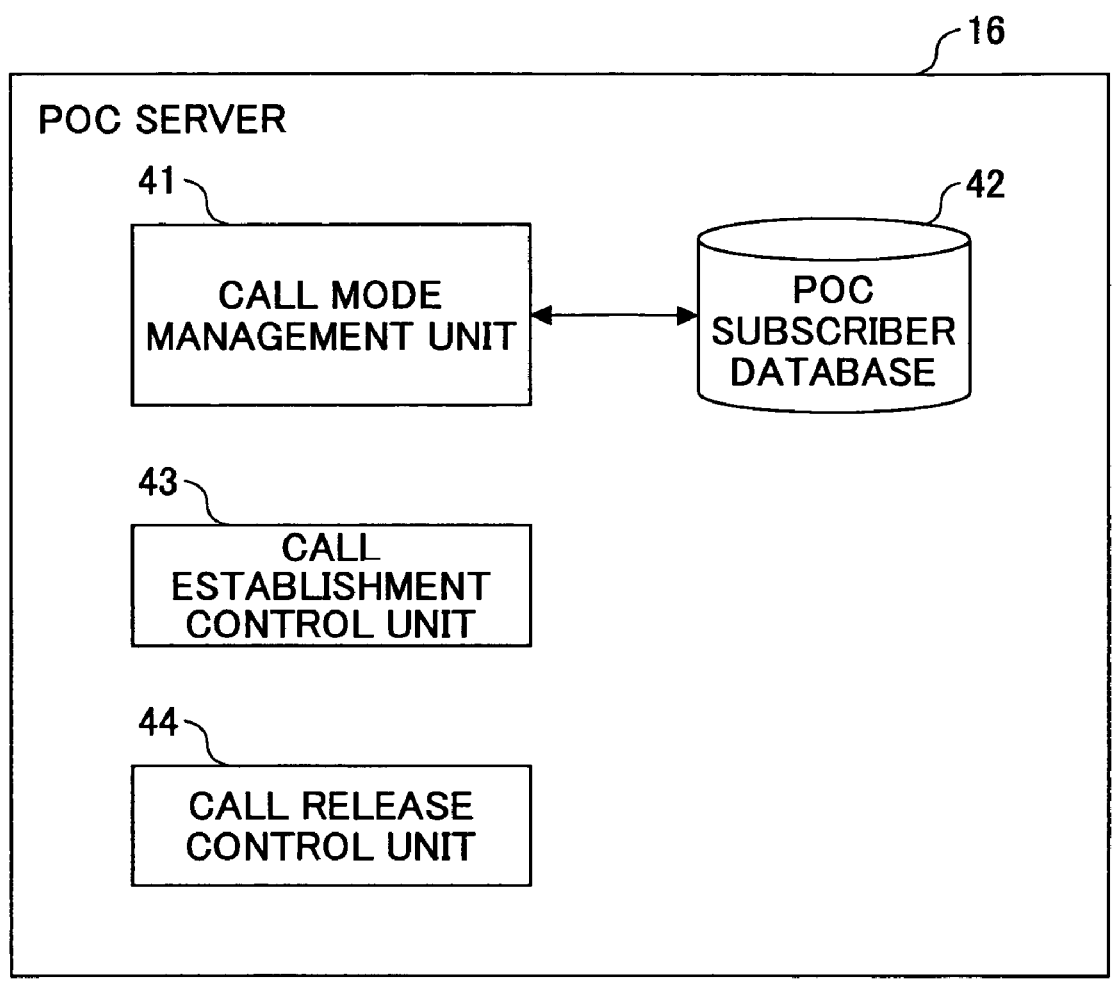
FIG. 4 shows a functional block diagram of a POC server.

FIG. 4 indicates a functional block diagram of the POC server 16. As shown in FIG. 4, the POC server 16 includes a call mode management unit 41, a POC subscriber database 42, a call establishment control unit 43 and a call release control unit 44. The call mode management unit 41 stores POC session status for each POC service subscriber in the POC subscriber database 42, so as to manage the POC session status for each POC subscriber. In addition, the call mode management unit 41 sends a request to the core network 14 for switching between group communications call to a voice call according to POC to CS automatic switching setting information. The POC subscriber database 42 stores POC session numbers each for identifying POC sessions, information indicating whether a POC session is being performed, and POC to CS automatic switching setting information.

The call establish control unit 43 performs control for establishing a group communications call (POC session). The call release control unit 44 performs control for releasing the group communications call.

First Embodiment

Figure 5A:
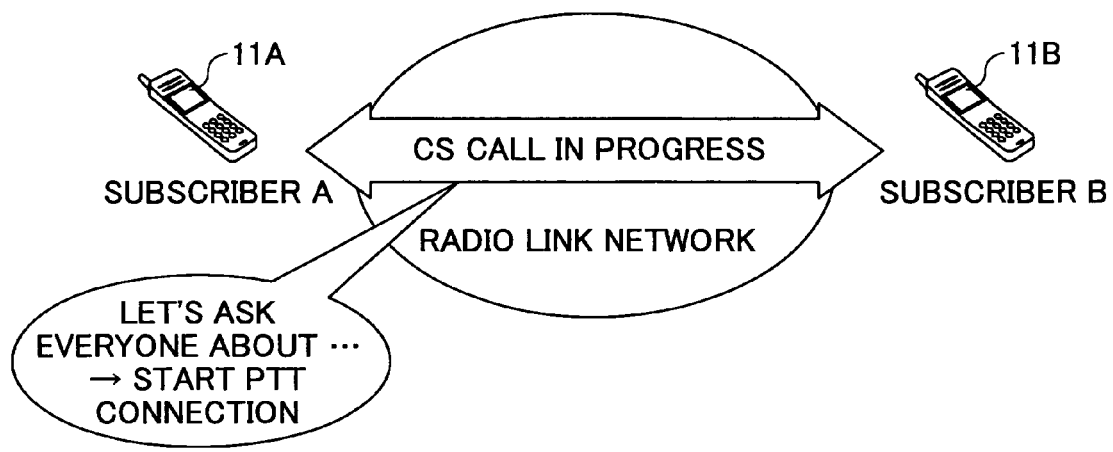

FIG. 5A shows a situation in which a CS call is being performed between a subscriber A (subscriber terminal 11A) and a subscriber B (subscriber terminal 11B).

Figure 5B:
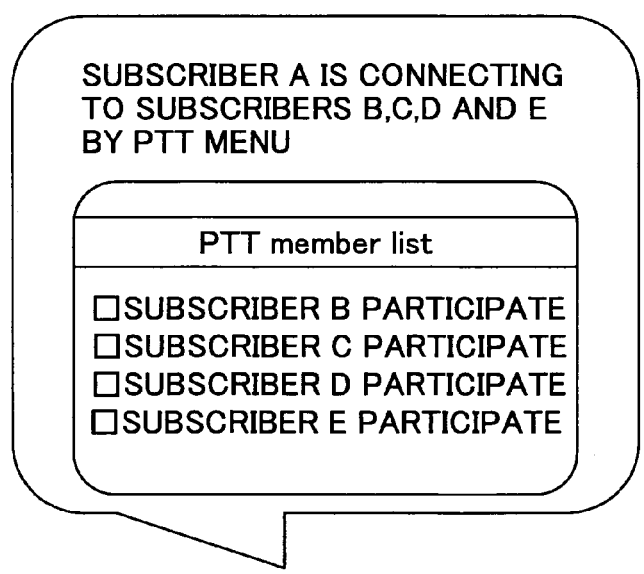

When the subscriber A needs to perform group communications since the subscriber A wants to ask a question that arises in the conversation between the subscriber A and the subscriber B, the subscriber A displays "push talk list" on the subscriber terminal 11A based on the POC service so as to select subscribers B, C, D and E to establish group communications calls (POC session) and start group communications as shown in FIG. 5B. By the way, PTT means push to talk. Alternatively, the group communications can be initiated by selecting the "push talk list" of the POC service including the subscriber B that is pre-registered in the POC server 16.

When the subscriber terminal 11B receives a POC session establishment request in which the subscriber A is the host while performing the CS call, the subscriber terminal 11B automatically switches the CS call to the POC session without being operated by the subscriber B as shown in FIG. 5C. In addition, the core network 14 detects that the POC session is established between the subscriber terminals 11A and 11B so as to automatically release the voice (CS) call connection between the subscriber terminals 11A and 11B. Accordingly, the CS call connection between the subscriber terminals 11A and 11B can be automatically switched to the group communications.

FIG. 6 shows a sequence between apparatuses in the first embodiment of the present invention. In this sequence, the subscriber A performs POC to the subscribers B, C and D while the CS call between the subscribers A and B is being performed.

In step S11, the subscriber A registers members (including the subscribers B, C and D) in a push talk list in the subscriber terminal 11A. In step S12, the subscriber A selects members (subscribers B, C and D) with whom the subscriber A performs the group communications from the push talk list on the subscriber terminal 11A. In step S13, the subscriber A calls the members (subscriber B, C and D) by pushing a push talk button on the subscriber terminal 11A. In step S14, a PS (packet service) link is established between the subscriber terminal 11A and the core network 14. This step can be performed by a known PS link establishment procedure. This procedure is performed in each of the subscriber terminal 11A, the radio base station 12A, the radio network control apparatus 13A and the core network 14.

In step S15, the subscriber terminal 11A establishes the group communications call (POC session) using the PS link. At this time, the subscriber terminal 11A registers, to the POC server 16, members (subscribers B, C and D) with whom the group communications are performed.

In step S16, the POC server 16 which received POC setting information sends a POC session establishment request to each of the subscriber terminals 11B-11D of the members (subscribers B, C and D). When a roger button is pushed in each of the subscriber terminals 11B-11D, a POC session establishment response is sent from the subscriber terminal to the POC server so that the POC session is established for each of the subscriber terminals 11B-11D.

In step S17, when the POC sessions to each communication partner are established, the POC server 16 reports POC session establishment completion to the core network 14. The core network 14 receives the POC session establishment completion for every subscriber of the communication partner.

In step S18, the core network 14 checks the call status of each subscriber. In step S19, the core network 14 determines whether the subscriber A is performing a CS call and the communication partner of the CS call is included in the established POC sessions. When this condition is satisfied, the core network 14 disconnects the CS call to the communication partner.

In this example, since the subscribes A and B are performing the CS call, the CS call between the subscribers A and B are disconnected. A known procedure can be used for disconnecting the CS call.

In step S20, the group communications (push talk) are performed among the members (subscribers A, B, C and D). Accordingly, switching from the CS call to the group communications call can be performed seamlessly.

Second Embodiment

Figure 7A:
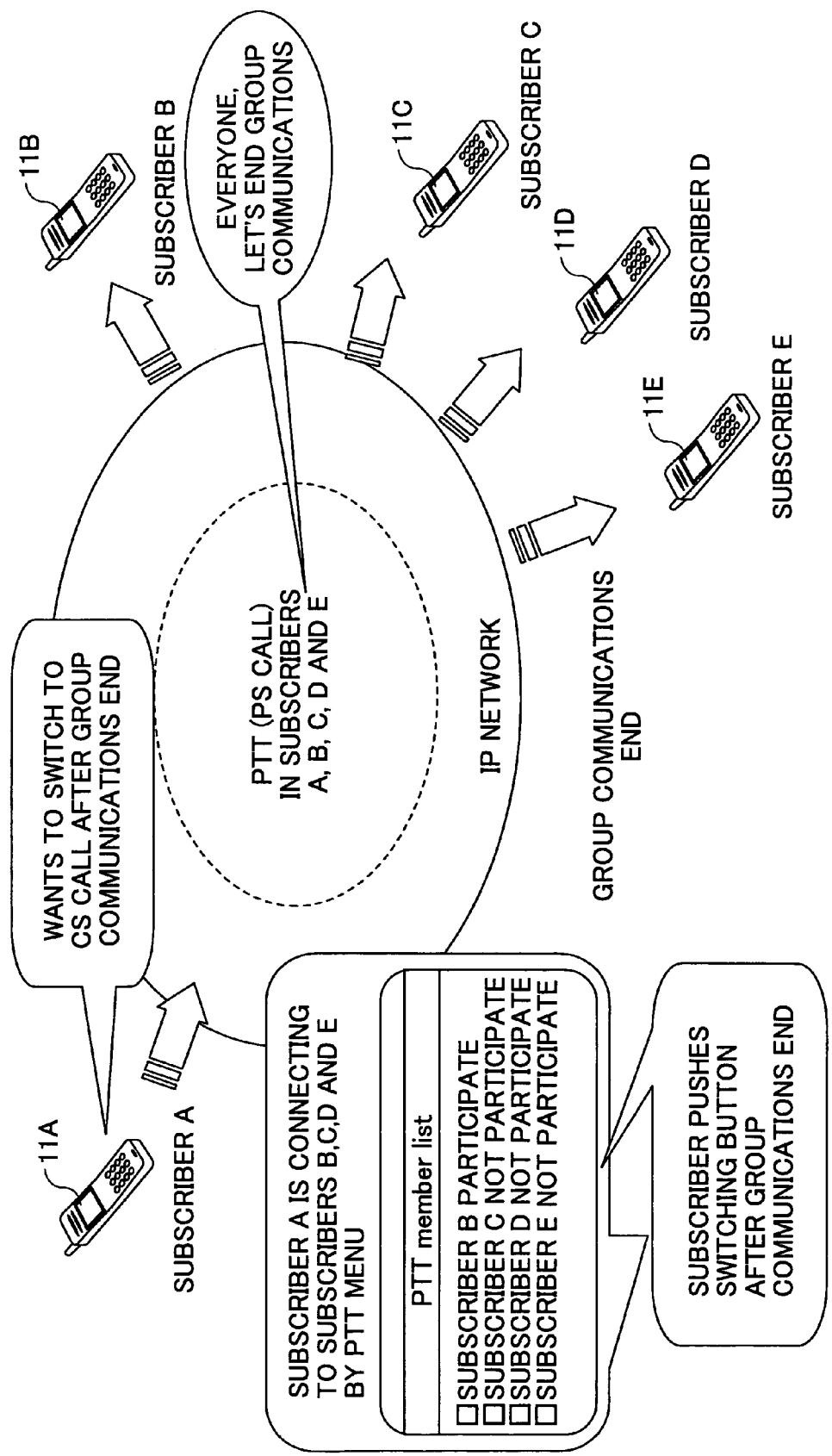
FIGS. 7A-7C are figures for explaining a second embodiment of the present invention.

FIG. 7A shows a situation in which the group communications are performed among the subscribes A, B, C, D and E in which the subscriber A is the host.

Figure 7B:
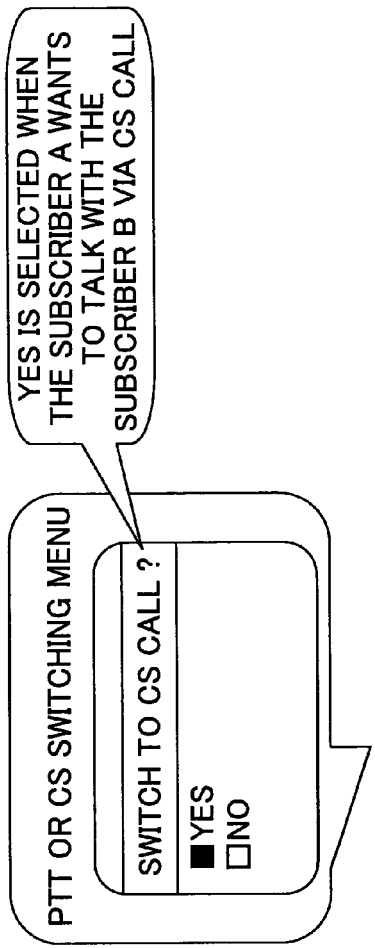

When the subscriber A wants to talk with the subscriber B after the group communications with the subscribers C, D and E end, the subscriber terminal 11A displays a switching menu shown in FIG. 7B based on operation by the subscriber A so that the group communications between the two subscribers can be switched to the CS call between the two subscribers.

Figure 7C:
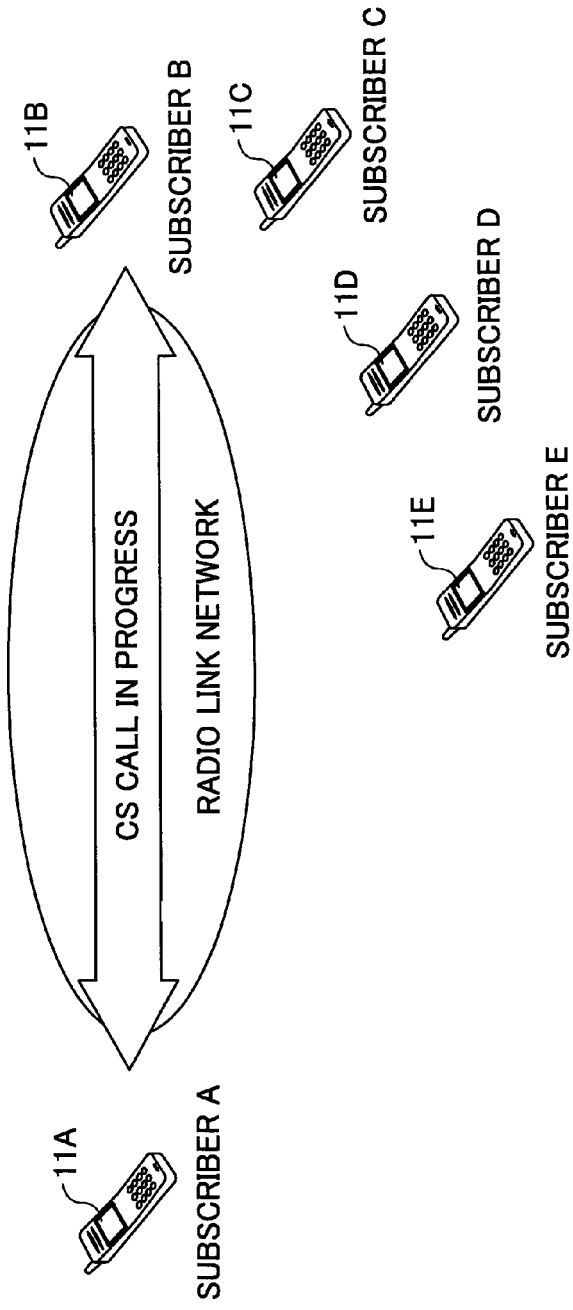

In this case, when the core network 14 detects establishment of CS call between the subscriber terminals A and B, the core network 14 checks POC session status of the subscriber A in the subscriber telephone number database 33 so as to end the POC session. Then, the status becomes one shown in FIG. 7C.

Third Embodiment

FIG. 8A shows a situation in which the subscriber terminal 11A connects to the subscriber terminals 11B-11E for performing the group communications, but the subscribers C, D and E do not participate in and only the subscriber B participate in the group communications.

Figure 8B:
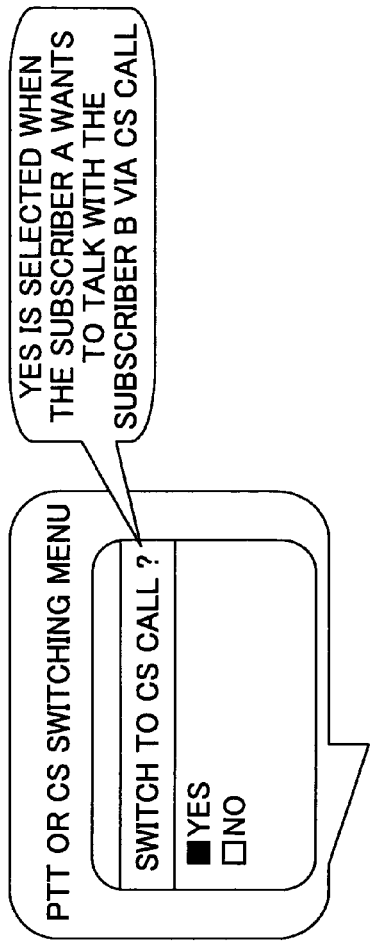

When the subscriber A wants to perform CS call between the subscribers A and B after group communications start between the subscribers A and B, switching from the group communications to the CS call is performed by a switching menu shown in FIG. 8B.

Figure 8C:
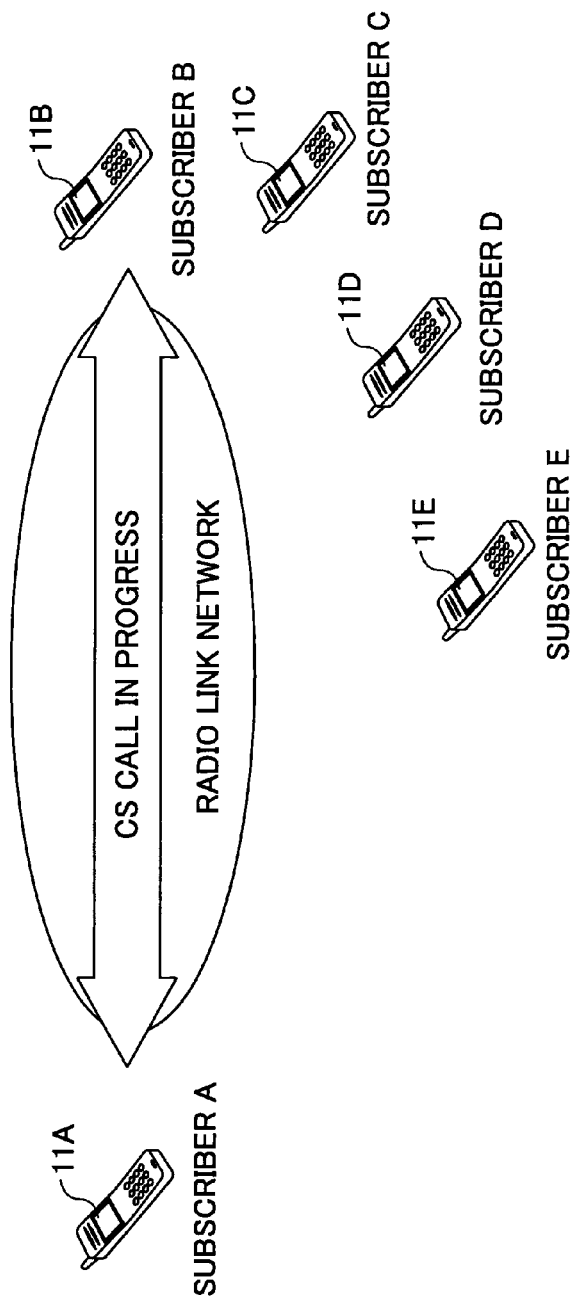

At this time, when the core network 14 detects CS call establishment between the subscriber terminals 11A and 11B, the core network 14 checks POC session status of the subscriber A in the subscriber telephone number database 33 so as to end the POC session. Then, the status becomes one shown in FIG. 8C.

Figure 9:
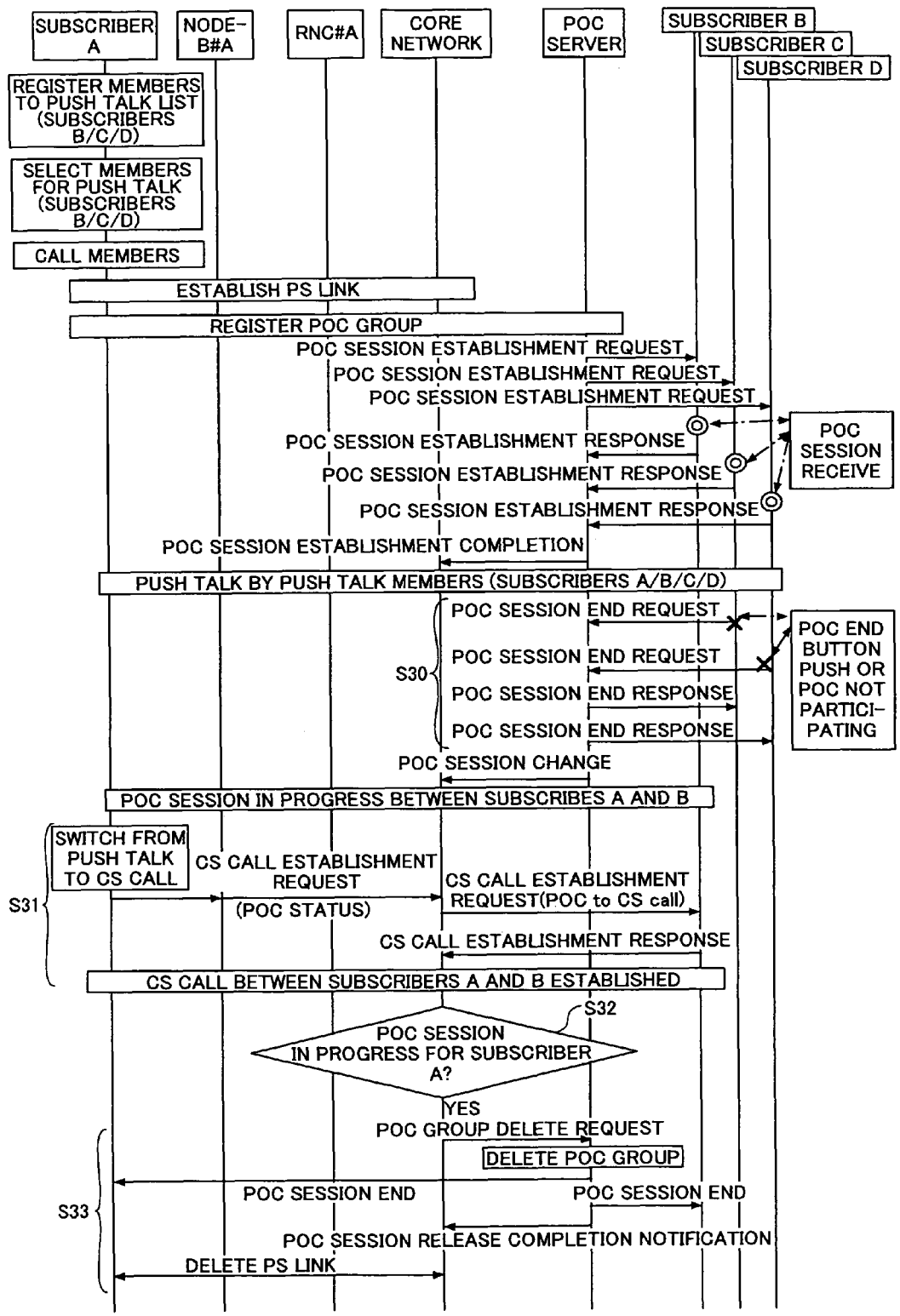
FIG. 9 shows a sequence among apparatuses in the second and third embodiments of the present invention.

FIG. 9 shows a sequence chart among apparatuses related to the second and third embodiments of the present invention. In this sequence, the subscriber A starts POC communications with the subscribers B, C and D, but, the subscribers C and D leave the POC communications so that the POC is performed between the subscribers A and B. And, then, the subscriber A wants to perform the CS call between the subscribers A and B. Then, POC is switched to the CS call. In FIG. 9, procedure from start to POC session establishment is the same as that of FIG. 6.

In step S30, when a call end button is pushed in the subscriber terminals 11C and 11D of the subscribers C and D, a POC session end request is sent to the POC sever from each of the subscriber terminals 11C and 11D so that the POC session ends for the subscriber terminals 11C and 11D. Then, a POC session end response is sent from the POC server to each of the subscriber terminals 11C and 11D, so that POC session is released for the subscriber terminals 11C and 11D. After that, subscribers A and B remain to be subscribers that continue the POC session. The POC server 16 sends a POC session change notification to the core network 14.

In step S31, the subscriber A recognizes that only the subscribers A and B are participating the POC service, so that the subscriber A performs operation for switching POC to CS call between the two subscribers. Accordingly, the subscriber terminal 11A sends a CS call establishment request signal with POC to CS automatic switching additional information to the core network 14, so that the core network 14 sends the CA call establishment request (POC to CS automatic switching) signal to the subscriber terminal 11B of the subscriber B. The subscriber terminal 11B of the subscriber B receives the POC to CS automatic switching additional information so as to respond to the signal so that the CS call session is established between the subscriber terminal 11A and the subscriber terminal 11B.

In step S32, after the CS call connection is established between the subscriber terminal 11A and the subscriber terminal 11B, the core network 14 determines whether the POC session is still continuing.

In step S33, when the POC session is continuing, the core network 14 sends a request for deleting POC performed by the subscriber A to the POC server 16. Then, the POC server 16 sends a POC session end request to each of the subscriber terminal 11A and the subscriber terminal 11B. After that, the POC server 16 sends a POC session release completion notification to the core network 14, so that the core network 14 deletes the PS link between the core network 14 and the subscriber terminal 11A.

Accordingly, switching from the group communications call to the CS call can be performed seamlessly.

Fourth Embodiment

Figure 10A:
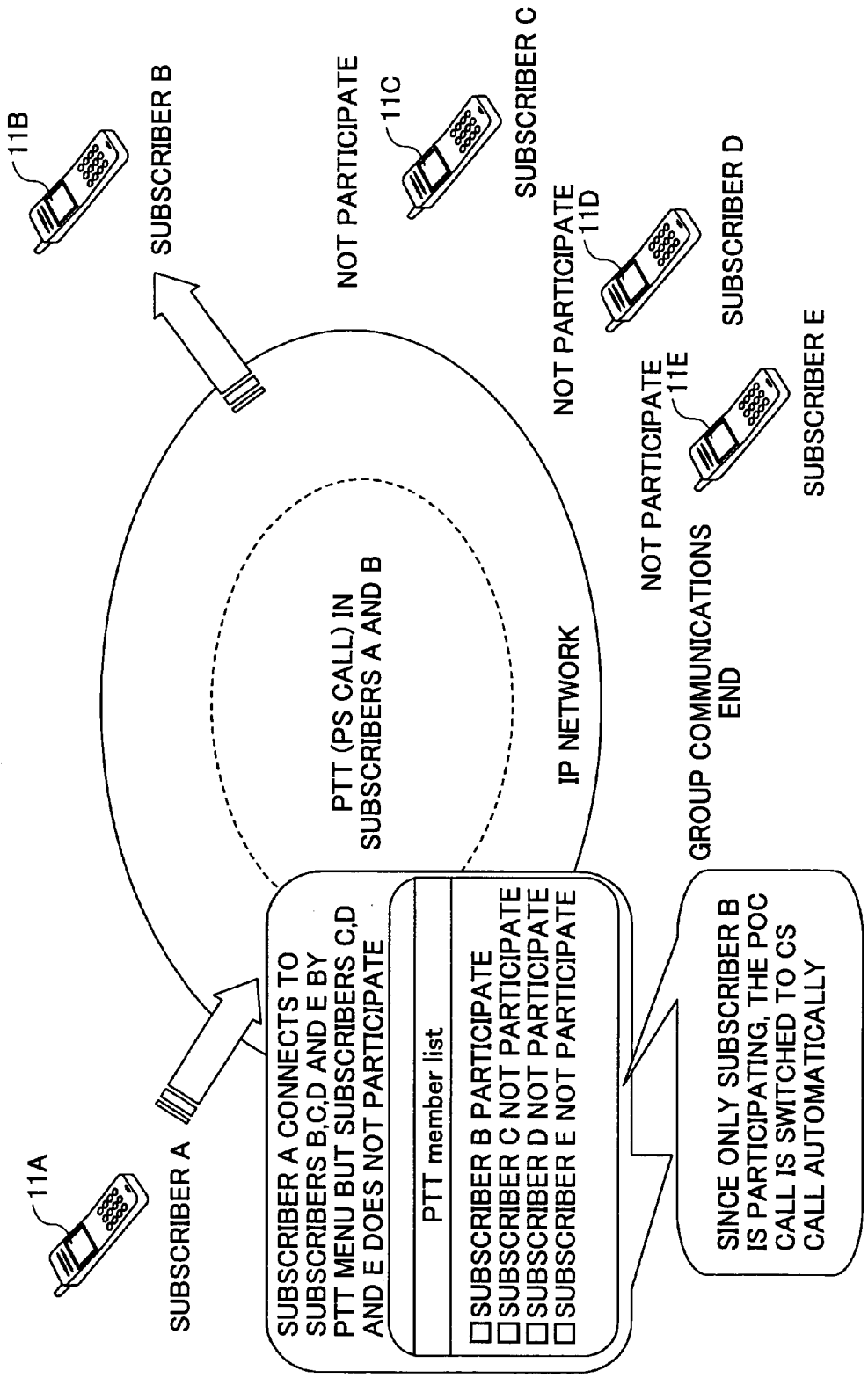

FIG. 10A shows a situation in which the subscriber A calls subscribes B, C, D and E, but the subscribers C, D and E are not participating in the group communications so that only the subscriber B is participating in the group communications.

The POC server 16 monitors the one-to-one call (between the subscriber terminal 11A and the subscriber terminal 11B) that is changed from one-to-multiple in the POC session established by the subscriber A as a host. When the call becomes one-to-one, the POC server 16 checks the status of the subscriber A on the POC subscriber database 42. When the POC to CS automatic switching setting is ON, the POC server 16 sends a CS call establishment request to the core network 14.

The core network 14 established the CS call between the subscriber terminal 11A and the subscriber terminal 11B. After the CS call is established, the POC server ends the POC session, so that the status becomes one shown in FIG. 10B.

Figure 11:
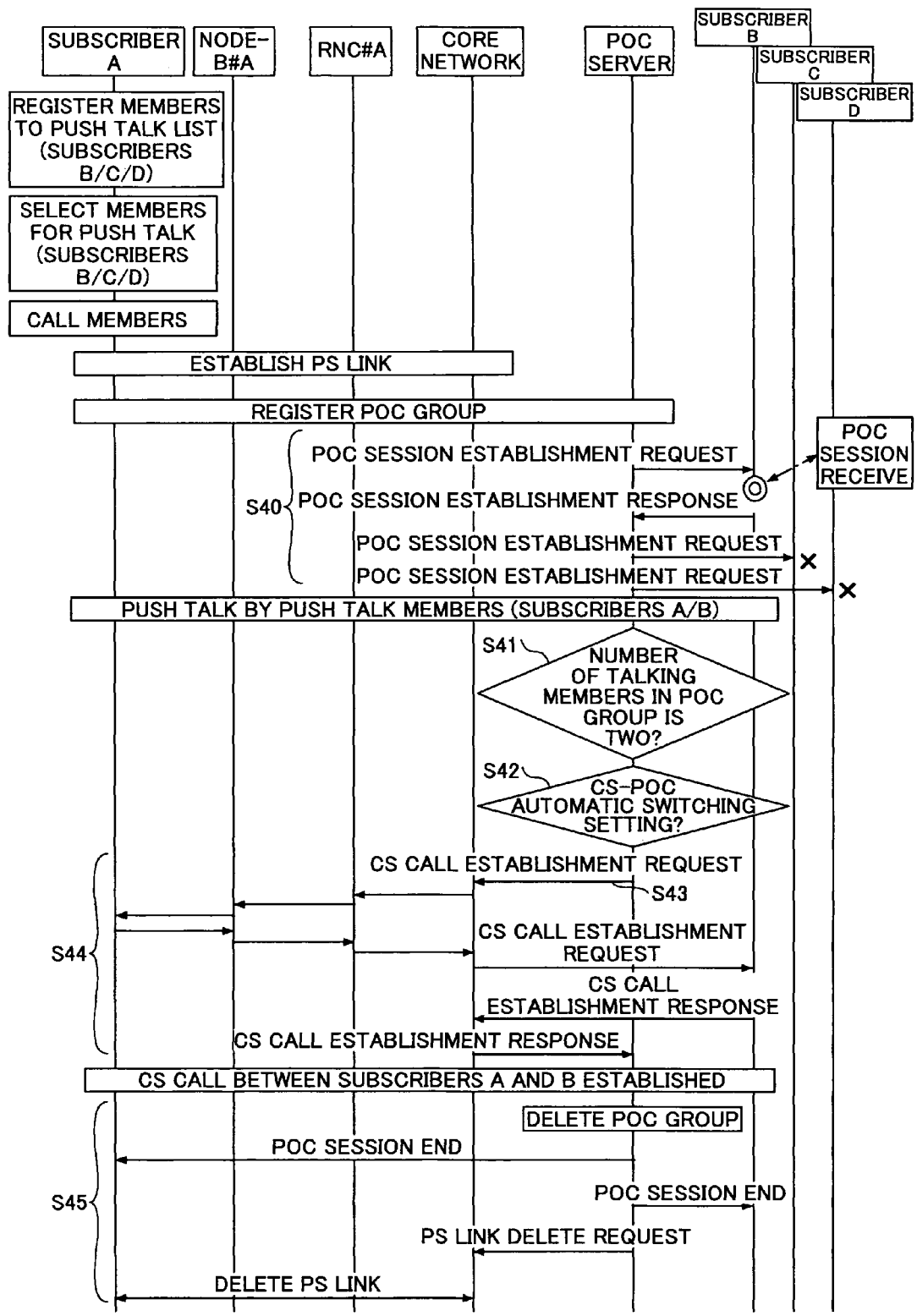
FIG. 11 shows a sequence among apparatuses in the fourth embodiment of the present invention.

FIG. 11 shows a sequence chart among apparatuses in the fourth embodiment of the present invention. In this sequence, only the subscriber B is participating in the POC group so that the call is automatically switched to the CS call between the subscribers A and B instead of operating a menu by the subscriber A.

In step S40, the POC session establishment request is sent to the subscribers B, C and D, but since the subscribers C and D are not participating the group communications, only the subscriber B sends the POC session establishment response. Alternatively, after each POC session is established for the subscribers B, C and D, the subscribers C and D disconnects the POC session to leave the group communications.

In step S41, the POC server 16 checks whether the number of members of the group communications (POC session) become two (the subscribers A and B).

In step S42, when the members becomes the two, the POC server 19 checks POC to CS automatic setting in the service data for the subscriber A in the POC subscriber database 42.

In step S43, when the POC to CS automatic switching setting is ON, the POC server 16 sends a CS call establishment request to the core network 14.

In step S44, the core network 14 sends the CS call establishment request to the radio network control apparatus 13A. The radio network control apparatus 13A sends a CS call establishment response signal to the core network 14. The core network 14 sends a CS call establishment response signal to the POC server 16.

In step S45, the POC server 16 deletes the POC session established for the subscriber A by sending a POC session end request to the subscriber terminals 11A and 11B, so that the CS call between the subscribers A and B remains. Accordingly, automatic switching from the group call to the CS call can be performed seamlessly.

<Automatic Switching/Manual Switching Setting in the Core Network and the POC Server>

Figure 12A:
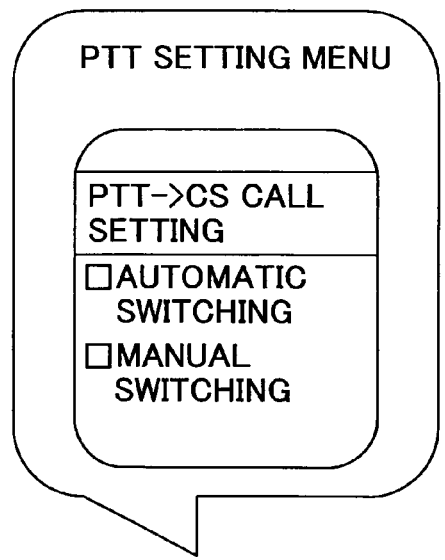
FIGS. 12A-12C are figures for explaining automatic switching/manual switching setting.
Figure 12B:
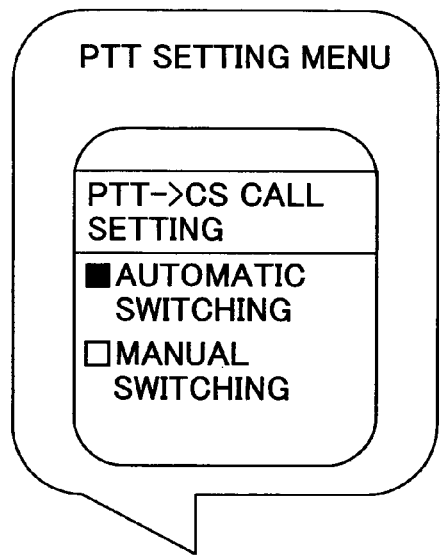
Figure 12C:
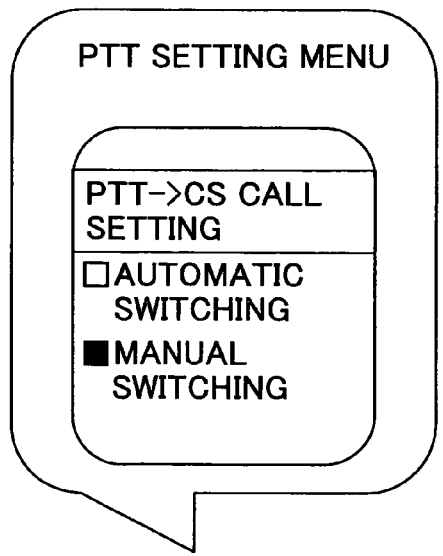

The automatic switching/manual switching setting in the core network and the POC server can be referred to or can be changed by the subscriber terminal 11A that is a host of the group communications as shown in FIG. 12A. In order to set automatic switching, the user selects "automatic switching" on the menu of the subscriber terminal shown in FIG. 12B. In order to set manual switching, the user selects "manual switching" on the menu of the subscriber terminal shown in FIG. 12C.

FIG. 13 shows a sequence among apparatuses for the automatic switching/manual switching setting.

In step S50, the subscriber A selects "POC to CS automatic switching" setting on the subscriber terminal 11A by performing menu operation.

In step S51, the subscriber terminal 11A sends a "POC to CS automatic switching" setting signal to the POC server 16 according to the selection in step S50.

In step S52, the core network 14 and the POC server 16 store the "POC to CS automatic switching" setting information in the POC subscriber database 42 (and in the subscriber telephone number database 33) as service data of the subscriber A.

Fifth Embodiment

Figure 14A:
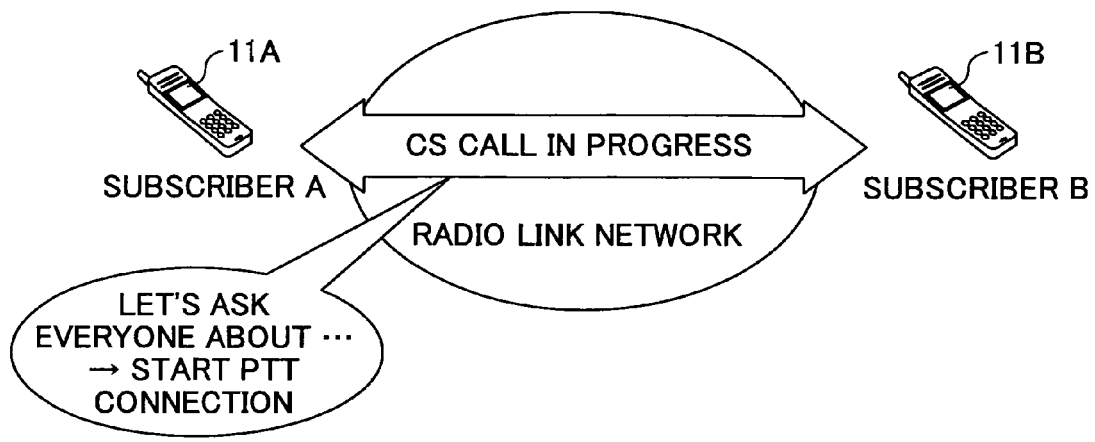
Figure 14B:
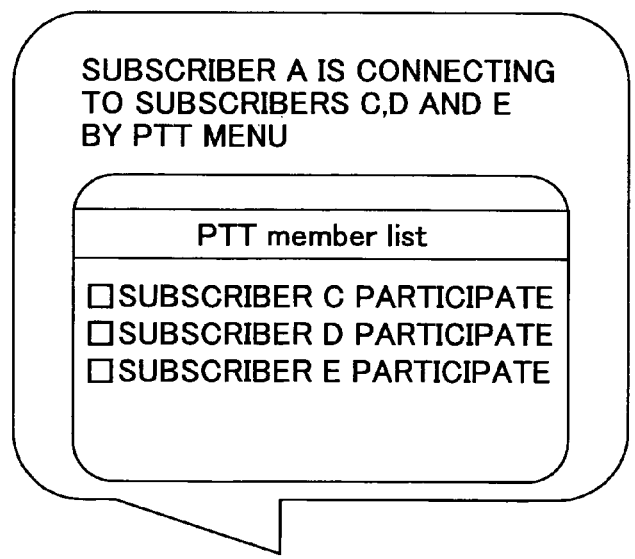

FIG. 14A shows a situation in which the CS call is in progress between the subscriber terminal 11A and the subscriber terminal 11B. It is assumed that the subscriber A wants to ask a question arising in the conversation with the subscriber B to other people (subscribers C, D and E) so that it becomes necessary to perform group communications. As shown in FIG. 14B, the subscriber A displays "push talk list" of the POC service on the subscriber terminal 11A so that the subscriber A selects subscribers C, D and E. Alternatively, the subscriber A selects "push talk list" of the POC service that is registered in the POC server 16 and that does not include the subscriber B.

In this case, the subscriber A wants to maintain the CS call between the subscribers A and B while the group communications are performed. Therefore, the subscriber A selects "CS call maintaining mode" from a dialog box displayed on the subscriber terminal 11A or the subscriber A sets the "CS call maintaining mode" to the subscriber terminal 11A so that the "CS call maintaining mode" is set and a holding tone is sent to the subscriber B.

Accordingly, as shown in FIG. 14C, the group communications can be started while maintaining the CS call between the subscribers A and B.

In addition, by pushing a switching button, the CS call between the subscribers A and B can be performed without disconnecting the group communications. When the subscriber A is talking with the subscriber B on the CS connection, the group communications cannot be used, but after the CS call with the subscriber B ends, it becomes possible to participate in the group communications automatically.

Figure 15:
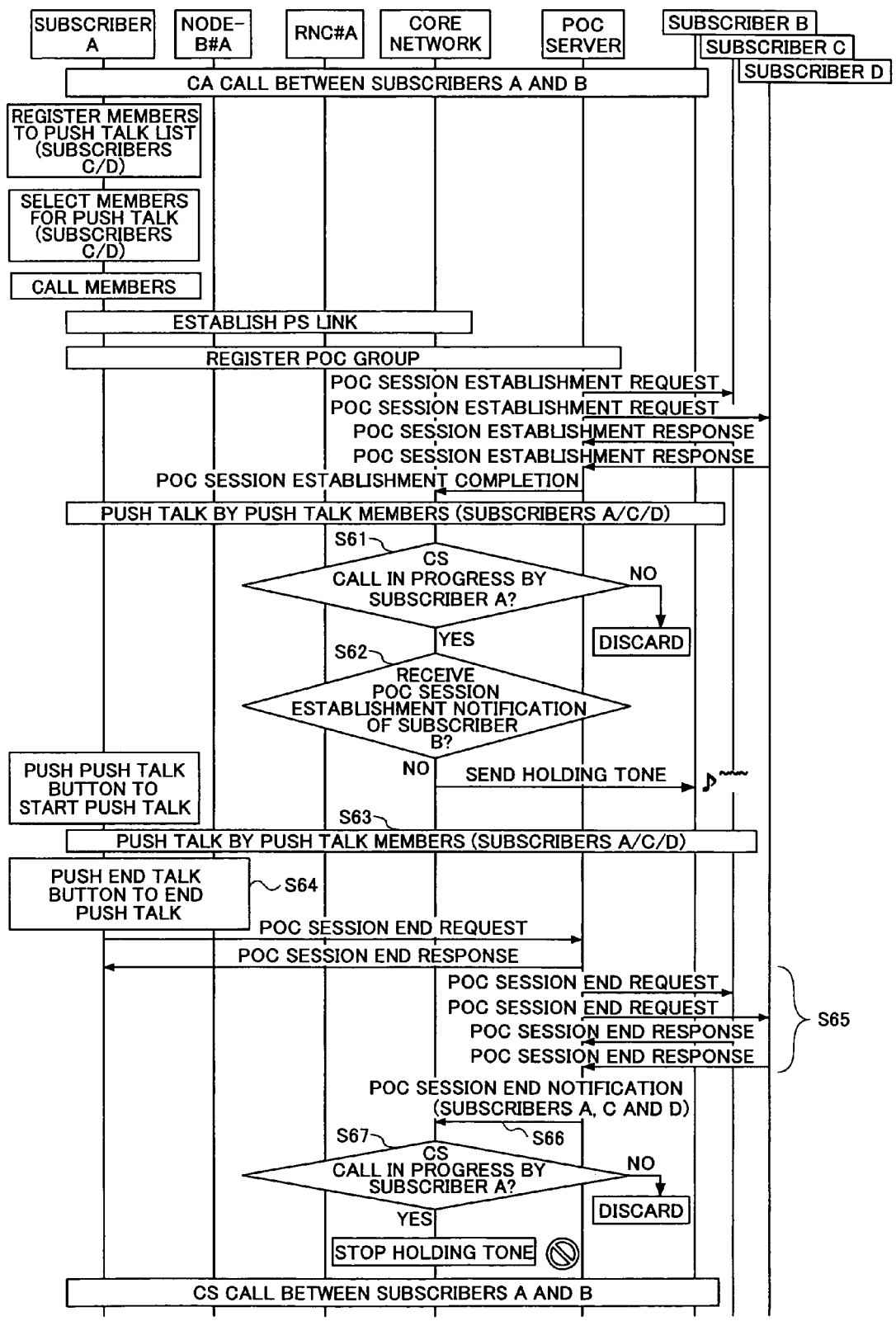
FIG. 15 shows a sequence among apparatuses in the fifth embodiment of the present invention.
Figure 16:
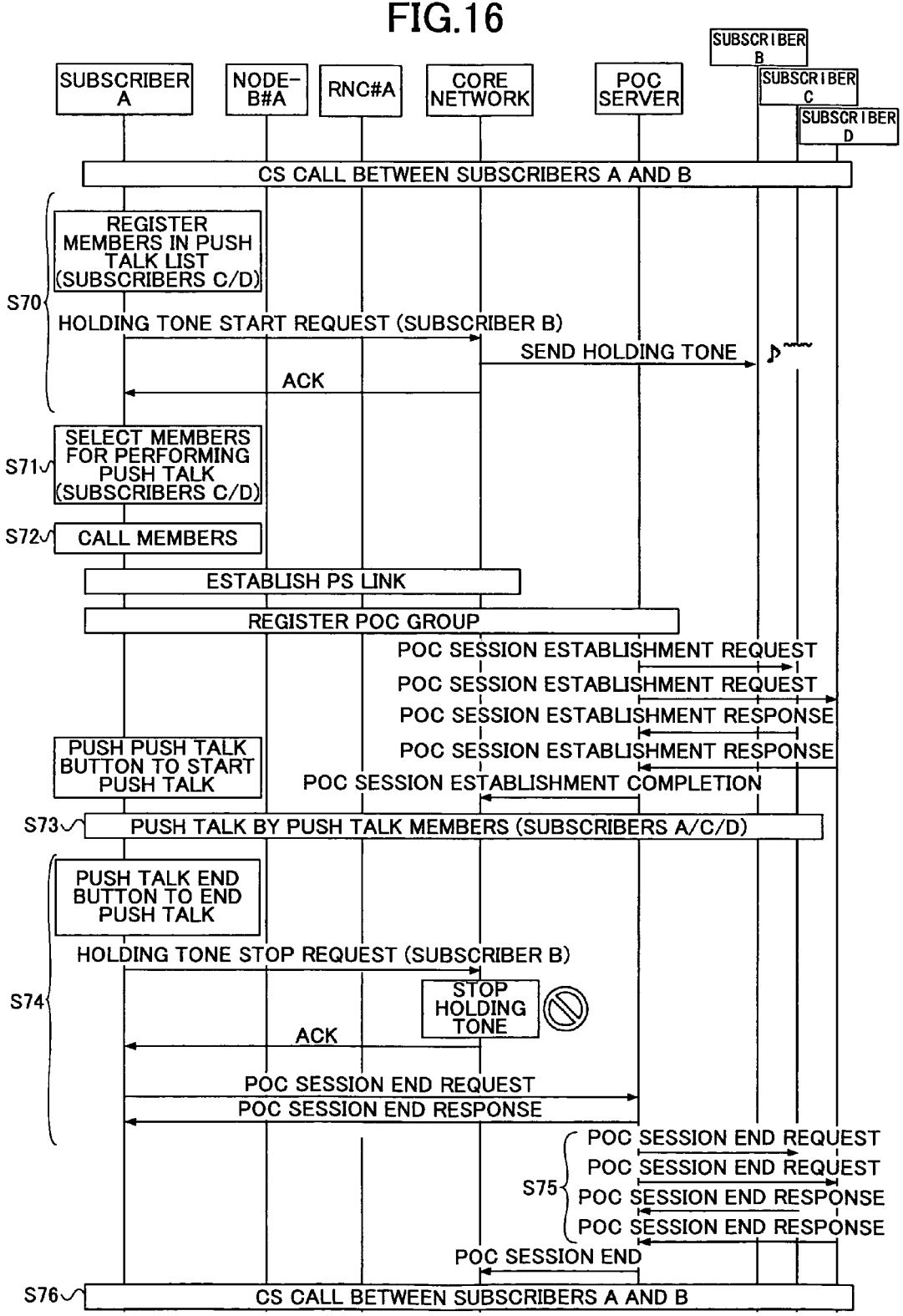
FIG. 16 shows a sequence among apparatuses in the fifth embodiment of the present invention.

FIG. 15 and FIG. 16 show a sequence among apparatuses in the fifth embodiment of the present invention. In the sequence, the subscriber A performs POC group communications with the subscribers C and D while CS call between the subscribers A and B is in progress, and the subscriber A temporarily puts the CS call on hold. After that, when the POC service ends, the CS call between the subscribers A and B begins seamlessly. The procedure from start to the POC session establishment is the same as that shown in FIG. 6.

By the way, after the POC sessions for each member is established, when the POC server 16 reports to the core network 14 that each member has established the POC session, the core network 14 stores call statuses of the POC members in the subscriber telephone number database 33.

In step S61 in FIG. 15, after the core network receives the POC session establishment completion message, the core network 14 checks whether CS call connection is established for the subscriber A. When the CS call connection is not established for the subscriber A, the core network 14 discards a received message.

In step S62, the core network 14 determines whether it receives a POC session establishment notification for the subscriber B who is performing the CS call with the subscriber A. If the core network 14 has received the POC session establishment notification, the core network 14 sends a CS call release request to the subscriber A. If the core network 14 has not received the POC session establishment notification, the core network 14 sends a holding tone to the subscriber B for a period while the subscriber A uses the POC service.

In step S63, POC communications start among the subscribers A, C and D.

In step S64, the subscriber A pushes a call ending button on the subscriber terminal 11A for ending the POC service so that the subscriber terminal 11A sends a POC session end request to the POC server 16.

In step S65, the POC server 16 sends the POC session end request to each of the subscriber terminals 11C and 11D, and the POC server 16 sends a POC session end response to each subscriber terminals.

In step S66, after the POC session ends for each member, the POC server 16 sends to the core network 14 a POC session end notification to report the core network 14 that the POC session ends for each subscriber. At this time, the core network 14 deletes the statuses of the POC members from the subscriber telephone number database 33.

In step S67, after the core network 14 receives the POC session end notification, the core network 14 determines whether CS call connection is in progress for the subscriber A. If the CS call connection is in progress for subscriber A, the core network 14 stops the holding tone to the subscriber B. If not, the core network 14 discards the received POC session end notification.

In step S70 in FIG. 16, the subscriber terminal 11A registers the subscribers C and D in a POC telephone directory while the CS call is in progress between the subscriber terminals 11A and 11B. Accordingly, a holding tone send request for the subscriber B is sent from the subscriber terminal 11A to the core network 14, so that the core network 14 sends the holding tone to the subscriber terminal 11B.

In step S71, the subscriber A selects members (subscribers C and D) with whom the subscriber A wants to perform the POC communications.

In step S72, the subscriber A calls the members. Accordingly, a PS connection is established between the subscriber terminal 11A and the core network 14. Procedure after this step to POC session establishment is the same as that shown in FIG. 6.

In step S73, the subscribers A, C and D starts POC communications.

In step S74, the subscriber A pushes a call end button so that a POC session end request is sent to the POC server 16. At the same time, the subscriber terminal 11A sends a holding tone stop request to the core network 14. The core network 14 stops the holding tone for the subscriber B.

In step S75, the POC server 16 sends a POC session end request to each of the subscribers C and D. In addition, the POC server 16 sends a POC session end message to the core network 14.

In step S76, the state returns to the original state in which the CS call is performed between the subscribers A and B.

Figure 17:
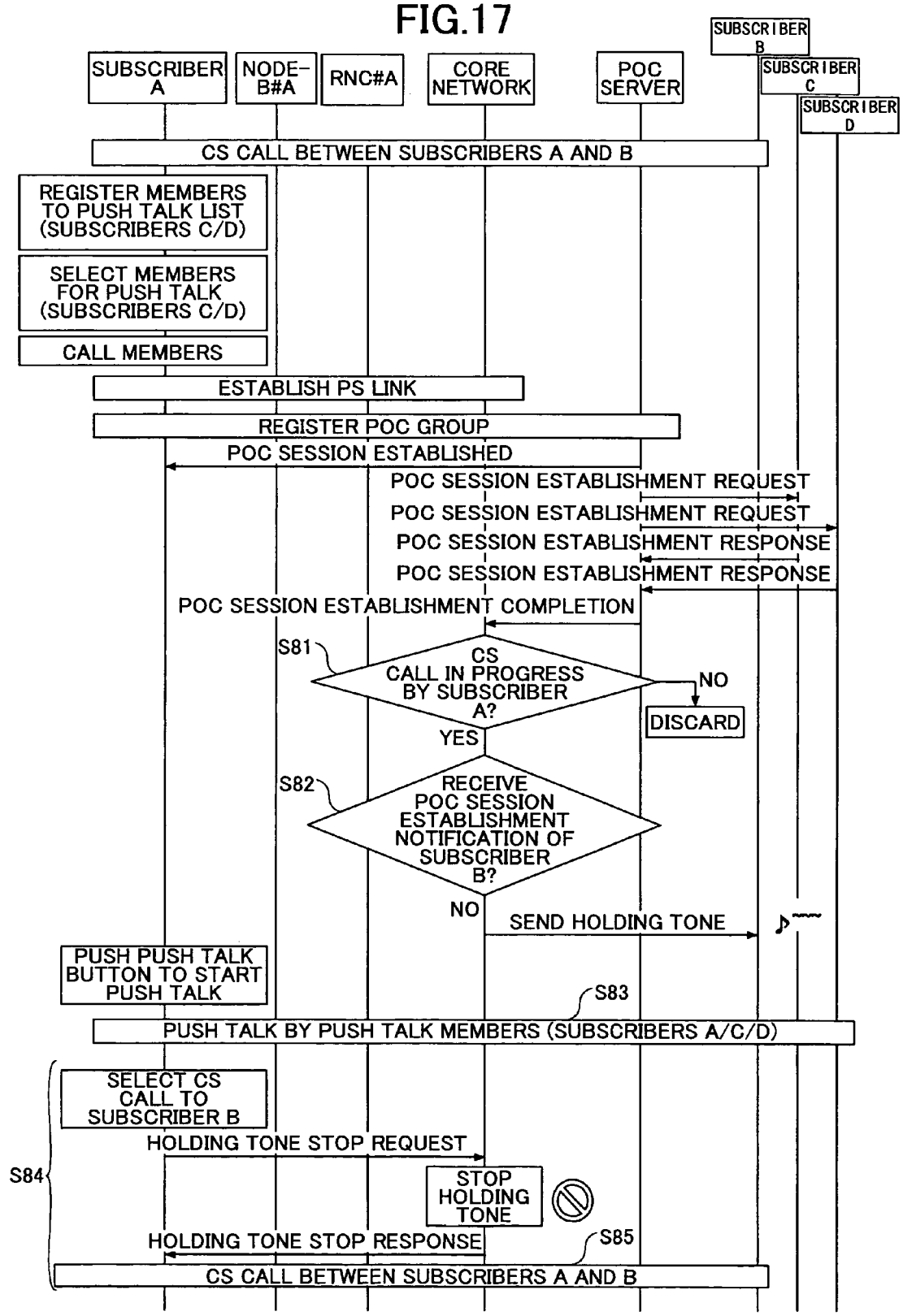
FIG. 17 shows a sequence among apparatuses in a modified example of the fifth embodiment of the present invention.
Figure 18:
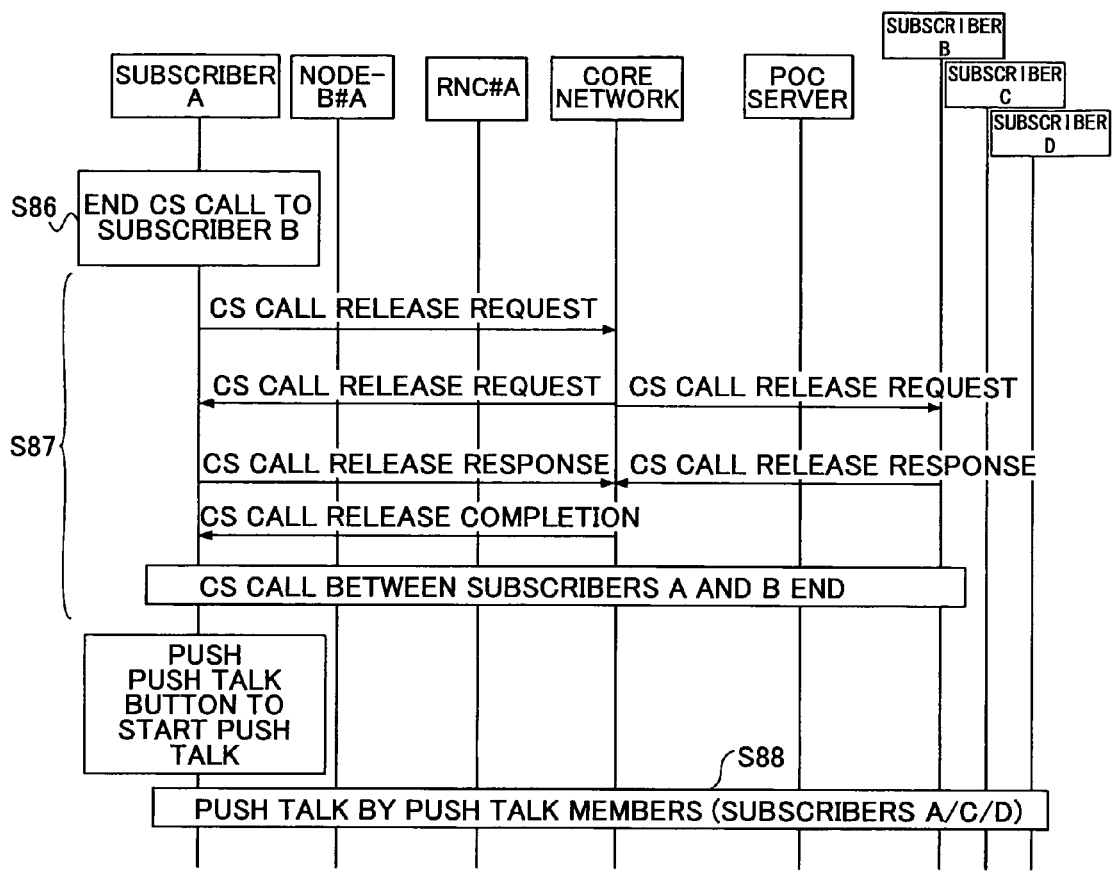
FIG. 18 shows a sequence among apparatuses in a modified example of the fifth embodiment of the present invention.

FIGS. 17 and 18 show a modified example of the sequence of the fifth embodiment of the present invention. In the sequence, the subscriber A performs the POC service with the subscribers C and D while the CS call between the subscribers A and B is in progress, and the subscriber A temporarily puts the CS call on hold. After that, when the POC service ends, the CS call between the subscribers A and B begins seamlessly. The procedure from start to POC session establishment is the same as that shown in FIG. 6.

In step S81 of FIG. 17, after the core network 14 receives a POC session establishment notification for the subscriber A, the core network 14 determines whether CS call is in progress for the subscriber A. If CS call is not in progress for the subscriber A, the core network 14 discards the POC session establishment notification message.

In step S82, the core network 14 determines whether it receives a POC session establishment notification of the subscriber B who is performing the CS call with the subscriber A. When the core network 14 has received the POC session establishment notification, the core network 14 sends a CS call release request to the subscriber terminal A. When the core network has not received the POC session establishment notification, the core network 14 sends a holding tone to the subscriber terminal 11B while the subscriber A is using the POC service.

In step S83, the subscriber A starts the POC service with the subscribers C and D.

In step S84, CS call with the subscriber B is selected by pushing a switching button by the subscriber A. Accordingly, the subscriber terminal 11A sends a holding tone stop request to the core network 14, so that the core network 14 stops the holding tone to the subscriber B. At this time, push talk is available between the subscribers C and D.

In step S86 in FIG. 18, the subscriber A pushes an end button to end the CS call.

In step S87, only the CS call between the subscribers A and B is released. In step S88, push talk becomes available among the subscribers A, C and D.

Accordingly, when both of the CS call connection and the group communications call connection are established, independence and confidentiality for the CS call and the group communications call can be kept by automatically transmitting the holding tone for the CS call or for the group communications call.

The present invention is not limited to the specifically disclosed embodiments, and variations and modifications may be made without departing from the scope of the present invention.

The present application contains subject matter related to Japanese patent application No. 2006-178479, filed in the JPO on Jun. 28, 2006, the entire contents of which are incorporated herein by reference.

What is claimed is:

1. A group communications switching method comprising the steps of:

maintaining a voice call between a first subscriber terminal and a second subscriber terminal when it becomes necessary to perform group communications while the voice call is in progress;

starting a group communications call by the first subscriber terminal so as to call at least a group communications member other than the first subscriber terminal and the second subscriber terminal; and disconnecting the voice call between the first subscriber terminal and the second subscriber terminal when the group communications call is established.

2. The group communications switching method as claimed in claim 1, wherein, when the group communications call with the at least a group communications member other than the first subscriber terminal and the second subscriber terminal ends, one of the first and second subscriber terminals requests a core network to switch the group communications call to a voice call; and the group communications call is disconnected when the voice call between the first and second subscriber terminals is established.

3. The group communications switching method as claimed in claim 1, wherein, when the group communications call with the at least a group communications member other than the first subscriber terminal and the second subscriber terminal ends, a server for controlling the group communications call requests a core network to switch the group communications call to a voice call; and the group communications call is disconnected when the voice call between the first and second subscriber terminals is established.

4. A server comprising:

a monitoring unit configured to monitor at least a member participating in a group communications call, wherein while a voice call between a first subscriber terminal and a second subscriber terminal is maintained when it becomes necessary to perform group communications while the voice call is in progress, the group communications call is started by a first subscriber terminal so as to call at least a group communications member other than the first subscriber terminal and a second subscriber terminal;

a switching request unit configured to request a core network to switch the group communications call to a voice call when the group communications call with the at least a group communications member other than the first subscriber terminal and the second subscriber terminal ends; and a group communications call disconnecting unit configured to disconnect the group communications call when the voice call between the first and second subscriber terminals is established.

5. The server as claimed in claim 4, the server further comprising:

a storing unit configured to store setting information indicating whether to switch from the group communications to the voice call for each subscriber terminal, wherein the switching request unit refers to the storing unit to request switching to the voice call.

6. A group communications switching method comprising the steps of:

maintaining a voice call between a first subscriber terminal and a second subscriber terminal when it becomes necessary to perform group communications while the voice call is in progress;

starting a group communications call by the first subscriber terminal so as to call at least a group communications member other than the first subscriber terminal and the second subscriber terminal;

sending a holding tone to the second subscriber terminal when the group communications call is established; and stopping the holding tone sent to the second subscriber terminal when the group communications call ends.

7. A group communications switching method comprising the steps of:

maintaining a voice call between a first subscriber terminal and a second subscriber terminal when it becomes necessary to perform group communications while the voice call is in progress;

starting a group communications call by the first subscriber terminal so as to call at least a group communications member other than the first subscriber terminal and the second subscriber terminal;

sending a holding tone to the second subscriber terminal when the group communications call is established; and stopping the holding tone sent to the second subscriber terminal when the voice call is selected based on switching operation performed on the first subscriber terminal.

* * * * *